(12) United States Patent
Vallius et al.

(10) Patent No.: US 11,747,621 B2
(45) Date of Patent: Sep. 5, 2023

(54) DICHROIC COATINGS TO IMPROVE DISPLAY UNIFORMITY AND LIGHT SECURITY IN AN OPTICAL COMBINER

(71) Applicant: Microsoft Technology Licensing, LLC, Redmond, WA (US)

(72) Inventors: Tuomas Heikki Sakari Vallius, Kirkland, WA (US); Pietari Tuomisto, Helsinki (FI); Jani Kari Tapio Tervo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 17/092,223

(22) Filed: Nov. 7, 2020

(65) Prior Publication Data

US 2022/0146827 A1    May 12, 2022

(51) Int. Cl.
*G02B 27/01* (2006.01)
*C03C 17/245* (2006.01)
(Continued)

(52) U.S. Cl.
CPC ...... *G02B 27/0172* (2013.01); *C03C 17/2456* (2013.01); *G02B 5/18* (2013.01);
(Continued)

(58) Field of Classification Search
CPC .. G02B 27/0172; G02B 27/4205; G02B 5/18; G02B 58/26; G02B 6/005; G02B 6/0076;
(Continued)

(56) References Cited

U.S. PATENT DOCUMENTS 5,795,708 A * 8/1998 Boutet ............... G03C 1/498
430/617
9,891,436 B2    2/2018 Wall et al.
(Continued)

FOREIGN PATENT DOCUMENTS

DE      102017129978 A1    6/2019

OTHER PUBLICATIONS

"International Search Report and Written Opinion Issued in PCT Application No. PCT/US21/052335", dated Jan. 14, 2022, 16 Pages.
(Continued)

*Primary Examiner* — Marin Pichler
*Assistant Examiner* — Mitchell T Oestreich
(74) *Attorney, Agent, or Firm* — Mark K. Young; Mayer & Williams, PC

(57) ABSTRACT

Reflectors comprising thin film dichroic coatings are located on various components of a waveguide-based optical combiner in a see-through display of a head-mounted display (HMD) device to reduce color cross-coupling in holographic images and reflect forward-projected holographic image light back to a user's eye. The dichroic coatings implement narrowband reflectors for each of one or more colors of an RGB (red, green, blue) color model over the angular range associated with the field of view (FOV) of the virtual portion of the see-through display. Utilization of the dichroic coatings can improve virtual display uniformity and lessen sharp edge defects by reducing cross-coupling and may also improve light security by reducing the forward-projected holographic image light that escapes from the HMD device.

18 Claims, 22 Drawing Sheets

(51) Int. Cl.
  *G02B 5/18* (2006.01)
  *G02B 5/26* (2006.01)
  *F21V 8/00* (2006.01)
  *G02B 27/42* (2006.01)

(52) U.S. Cl.
  CPC .............. *G02B 5/26* (2013.01); *G02B 6/005* (2013.01); *G02B 6/0023* (2013.01); *G02B 6/0076* (2013.01); *G02B 27/4205* (2013.01); *C03C 2217/212* (2013.01); *C03C 2217/213* (2013.01); *C03C 2217/214* (2013.01); *C03C 2217/70* (2013.01); *C03C 2218/15* (2013.01); *G02B 2027/0114* (2013.01); *G02B 2027/0178* (2013.01)

(58) Field of Classification Search
  CPC .......... G02B 6/0023; G02B 2027/0114; G02B 2027/0178; C03C 17/2456; C03C 2217/212; C03C 2217/213; C03C 2217/214; C03C 2217/70; C03C 2218/15
  USPC ......................................................... 359/558
  See application file for complete search history.

(56) References Cited

U.S. PATENT DOCUMENTS

| | | |
|---|---|---|
| 10,261,318 B2 | 4/2019 | TeKolste et al. |
| 10,393,945 B2 | 8/2019 | Kim et al. |
| 10,473,926 B2 | 11/2019 | Lee et al. |
| 2016/0110920 A1 | 4/2016 | Schowengerdt |
| 2018/0052501 A1 | 2/2018 | Jones et al. |
| 2018/0180817 A1* | 6/2018 | Yeoh .................. G02B 27/4277 |
| 2018/0231771 A1 | 8/2018 | Schuck et al. |
| 2019/0011708 A1 | 1/2019 | Schultz et al. |
| 2020/0225471 A1 | 7/2020 | Waldern et al. |
| 2020/0278498 A1 | 9/2020 | Schultz et al. |

OTHER PUBLICATIONS

Fales, Gregory, "Optical Components & Systems: Simplify Laser System Design with Dichroic Filters and Mirrors", Retrieved From: https://www.laserfocusworld.com/optics/article/16556864/optical-components-systems-simplify-laser-system-design-with-dichroic-filters-and-mirrors, Jan. 1, 2013, 10 Pages.

* cited by examiner

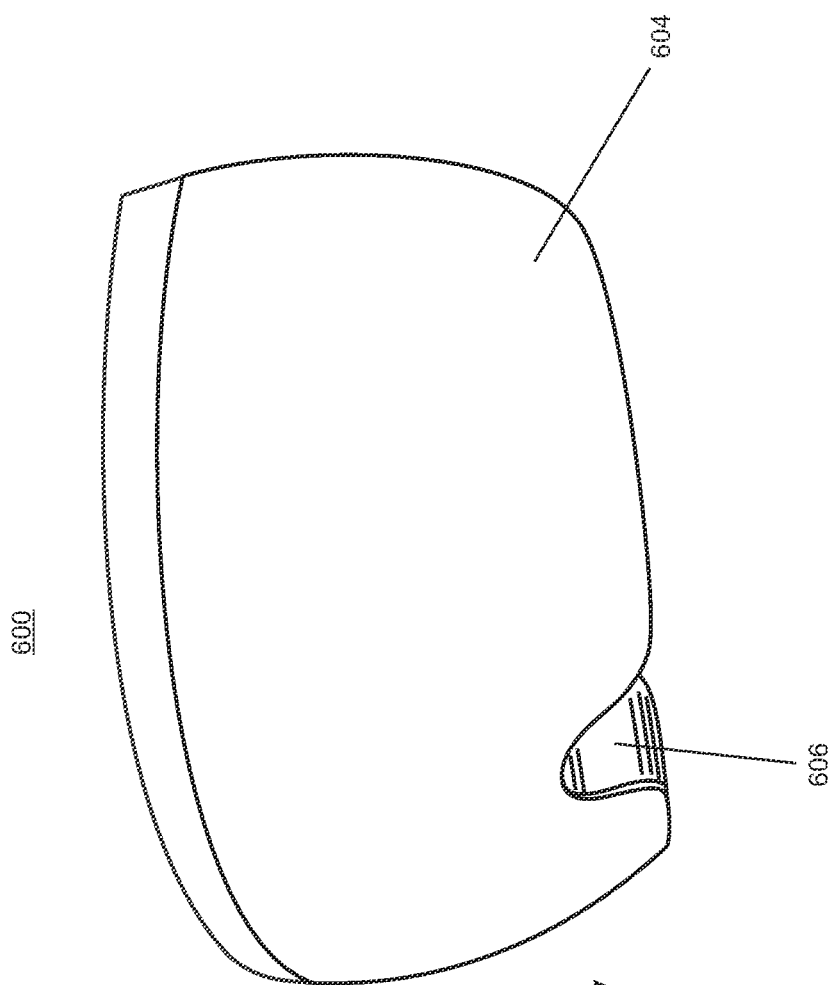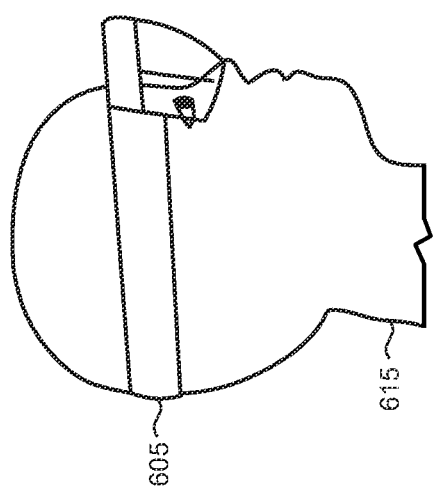
FIG 6

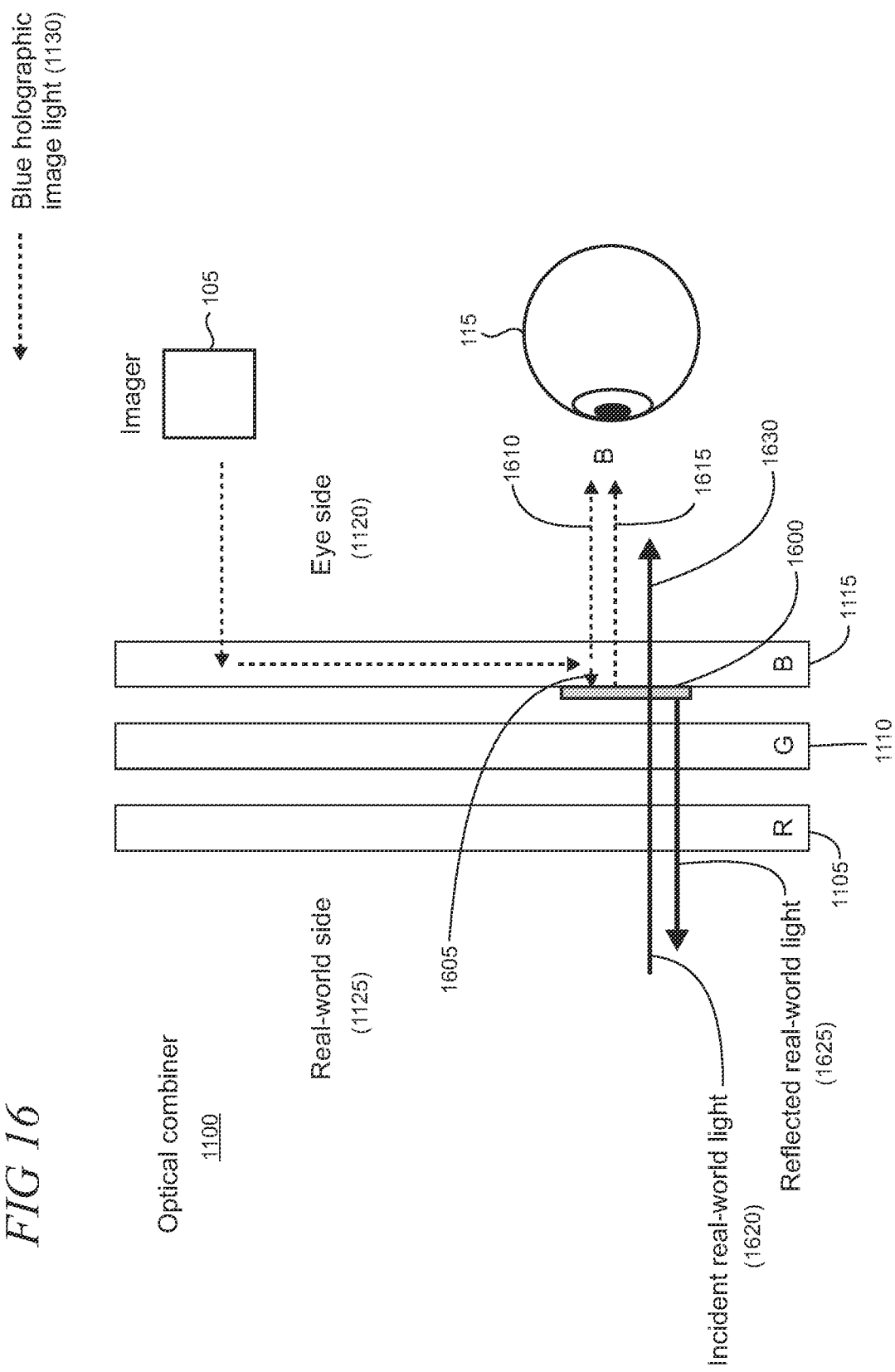

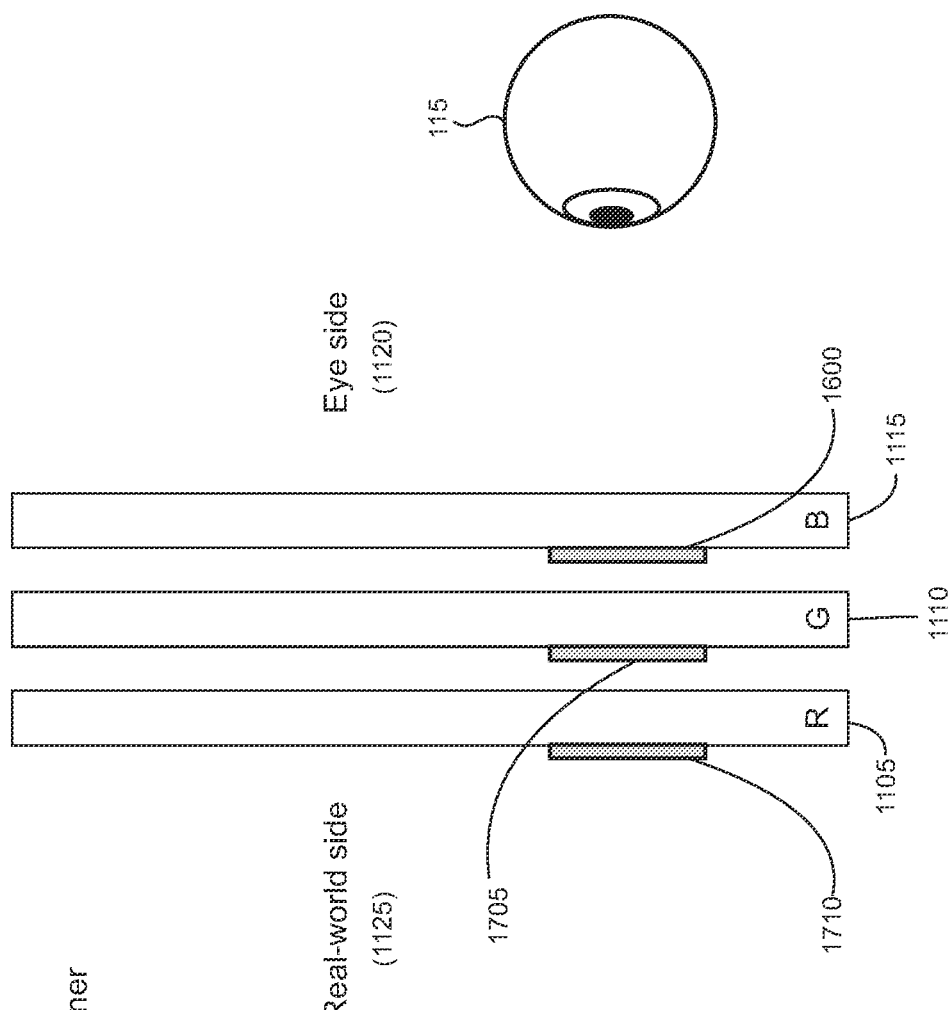

DICHROIC COATINGS TO IMPROVE DISPLAY UNIFORMITY AND LIGHT SECURITY IN AN OPTICAL COMBINER

BACKGROUND

Mixed-reality computing devices, such as head-mounted display (HMD) systems and handheld mobile devices (e.g. smart phones, tablet computers, etc.), may be configured to display information to a user about virtual objects, such as holographic images, and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

Reflectors comprising thin film dichroic coatings are located on various components of a waveguide-based optical combiner in a see-through display of a head-mounted display (HMD) device to reduce color cross-coupling in holographic images and reflect forward-projected holographic image light back to a user's eye. The dichroic coatings implement narrowband reflectors for each of one or more colors of an RGB (red, green, blue) color model over the angular range associated with the field of view (FOV) of the virtual portion of the see-through display. Utilization of the dichroic coatings can improve virtual display uniformity and lessen sharp edge defects by reducing cross-coupling and may also improve light security by reducing the forward-projected holographic image light that escapes from the HMD device.

In various illustrative embodiments, the optical combiner employs multiple differently configured diffractive optical elements (DOEs) on each waveguide. The waveguides with the DOEs are stacked as plates in the optical combiner in which each plate handles one component of the color model. The DOEs are operatively combined to provide for in-coupling of holographic images from an image source, exit pupil expansion in two directions (e.g., horizontal and vertical), and out-coupling of the holographic images from the virtual portion of the display to the user's eyes. Wavelength-selective dichroic coatings may be applied as reflectors to backside surfaces of the waveguides behind one or more of the in-coupling DOEs to prevent undesirable color cross-coupling. Dichroic reflectors may be located behind one or more of the out-coupling DOEs to block forward-projection of holographic image light over an angular range of interest while simultaneously allowing a suitable amount of real-world light to be passed by the see-through display to the user's eyes.

The dichroic coatings for the reflectors are thin film interference coatings, implemented using alternating layers of materials having different refractive indices, that reflect wavelengths in a predetermined range while transmitting other ranges of wavelengths over a specified angular range. By being implemented as coatings, the dichroic reflectors improve color uniformity of the holographic images on the display without adding the undesirable bulk and weight to the HMD device that are associated with componentry of conventional solutions such as polarizing filters and bandpass filters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 6 shows a pictorial front view of a sealed visor that may be used as a component of a head-mounted display (HMD) device;

FIG. 16 shows an illustrative dichroic reflector that is disposed on a blue plate of an optical combiner in which the dichroic reflector is configured with a reflection band that is operative on the blue light component of an RGB color model;

FIG. 17 shows illustrative dichroic reflectors that are respectively disposed on blue, green, and red plates of an optical combiner;

Figure 1:
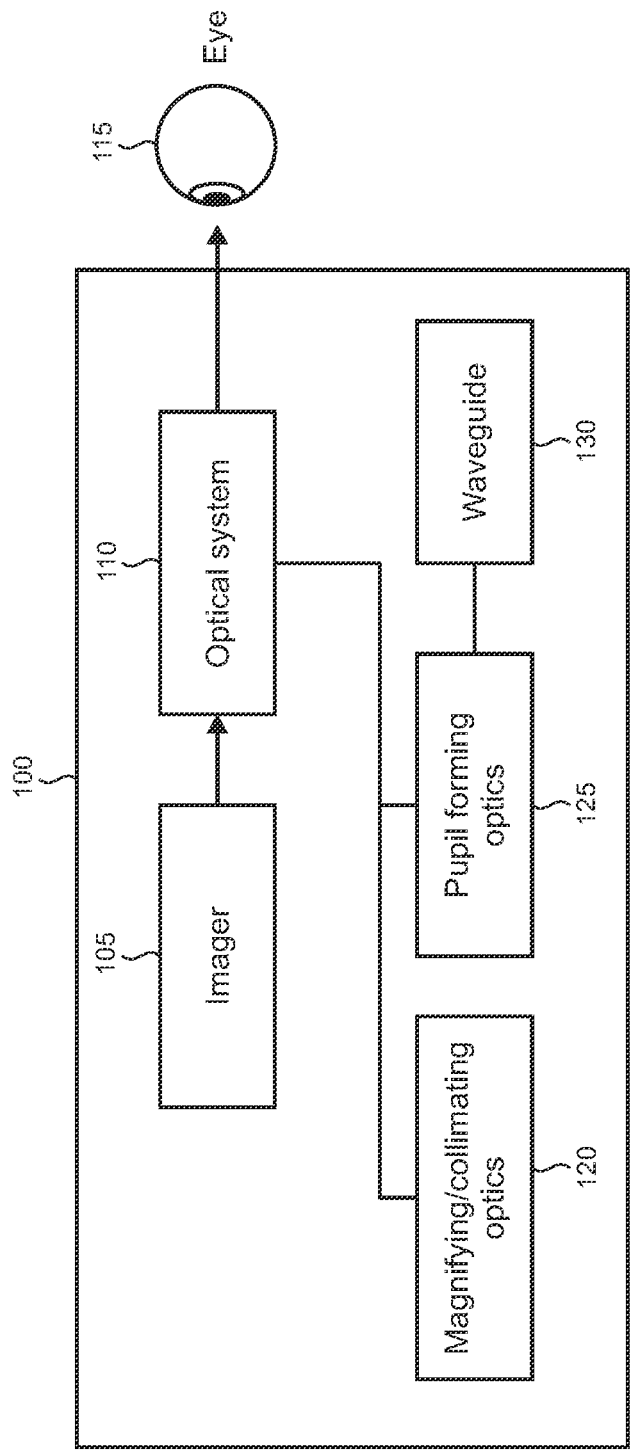
FIG. 1 shows a block diagram of an illustrative near-eye display system.

Like reference numerals indicate like elements in the drawings. The drawings are simplified schematic illustrations that are intended to aid the reader's comprehension of the concepts and features (some of which may be implemented at a nanoscopic scale) that are explained in the corresponding text. Elements in the drawings are not drawn to scale.

DETAILED DESCRIPTION

FIG. 1 shows a block diagram of an illustrative near-eye display system 100 which may incorporate an imager 105 and an optical system 110. The optical system 110 may also include magnifying and/or collimating optics 120 and pupil forming optics 125. In this illustrative example, the optical system is configured to provide functionalities as an exit pupil expander (EPE) and optical combiner, as described below.

The pupil forming optics 125 may include a waveguide 130 on which multiple diffractive optical elements (DOEs) are disposed and configured to provide in-coupling of incident light into the waveguide, exit pupil expansion in two directions, and out-coupling of light out of the waveguide to an eye 115 of a system user. Near-eye display systems are often used, for example, in head-mounted display (HMD) devices in industrial, commercial, and consumer applications. Other devices and systems may also use near-eye display systems, as described below. The near-eye display system 100 is an example that is used to provide context and illustrate various features and aspects of the present dichroic coatings.

The imager 105 in system 100 may include one or more sources of virtual objects or holographic images (collectively referred to herein as "holographic images" that work with the optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager may also include electronics such as processors, optical components such as mirrors and/or lenses, and/or mechanical and other components that enable a virtual display to be composed and provide one or more input optical beams to the optical system.

The near-eye display system 100 may be adapted to support implementations in HMDs and other devices to support various user experiences across a spectrum of applications, technologies, and use environments that may include virtual-reality, mixed-reality, augmented-reality, and/or extended reality scenarios. It may be appreciated that definitions of these terms can vary in the optical and display system industries. Accordingly, in the discussion herein, a virtual-reality environment includes only virtual objects, a mixed-reality environment includes real-world objects with virtual objects that are mixed in, and an augmented-reality environment includes real-world and virtual objects in which multi-sensory perception features are supported on a given device (e.g., audio, display, gestures, haptics, etc.), typically with the aid of device sensors, actuators, and the like. Extended-reality is an umbrella term that may be used to refer to all real- and virtual-world environments that are combined, in which technology is utilized to supplement the human experience in some form with varying degrees of immersiveness. In the discussion that follows, illustrative examples are provided in which real-world images/objects are combined in a see-through display with holographic images from a virtual world in a mixed-reality environment. However, it is emphasized that the present dichroic coatings are not limited to systems used in mixed-reality environments. It may be appreciated that the dichroic coatings can be adapted for use in augmented-, virtual-, and extended-reality environments.

In a near-eye display system 100 the imager does not actually shine the images on a surface such as a glass lens to create the visual display for the user. This is not feasible because the human eye cannot focus on something that is that close. Rather than create a visible image on a surface, the near-eye display system 100 uses the optical system 110 to form a pupil and the eye 115 acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the holographic image light after leaving the display system. The exit pupil defines the eyebox which comprises a spatial range of eye positions of the user in which the holographic images projected by the display system are visible.

The waveguide 130 facilitates light transmission between the imager and the eye. One or more waveguides can be utilized in the near-eye display system because they are transparent and because they are generally small and lightweight (which is desirable in applications such as HMD devices where size and weight are generally sought to be minimized for reasons of performance and user comfort). For example, the waveguide 130 can enable the imager 105 to be located out of the way, for example, on the side of the user's head or near the forehead, leaving only a relatively small, light, and transparent waveguide optical element in front of the eyes.

Figure 2:
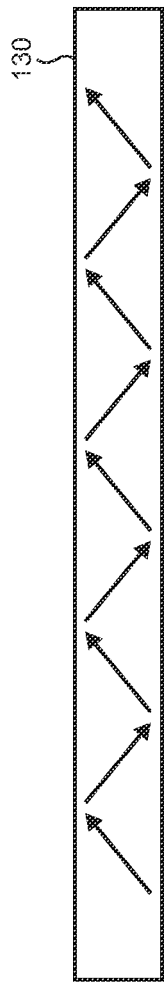
FIG. 2 shows propagation of light in a waveguide by total internal reflection (TIR)

In an illustrative implementation, the waveguide 130 operates using a principle of total internal reflection (TIR), as shown in FIG. 2, so that light can be coupled among the various optical elements in the system 100. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 3:
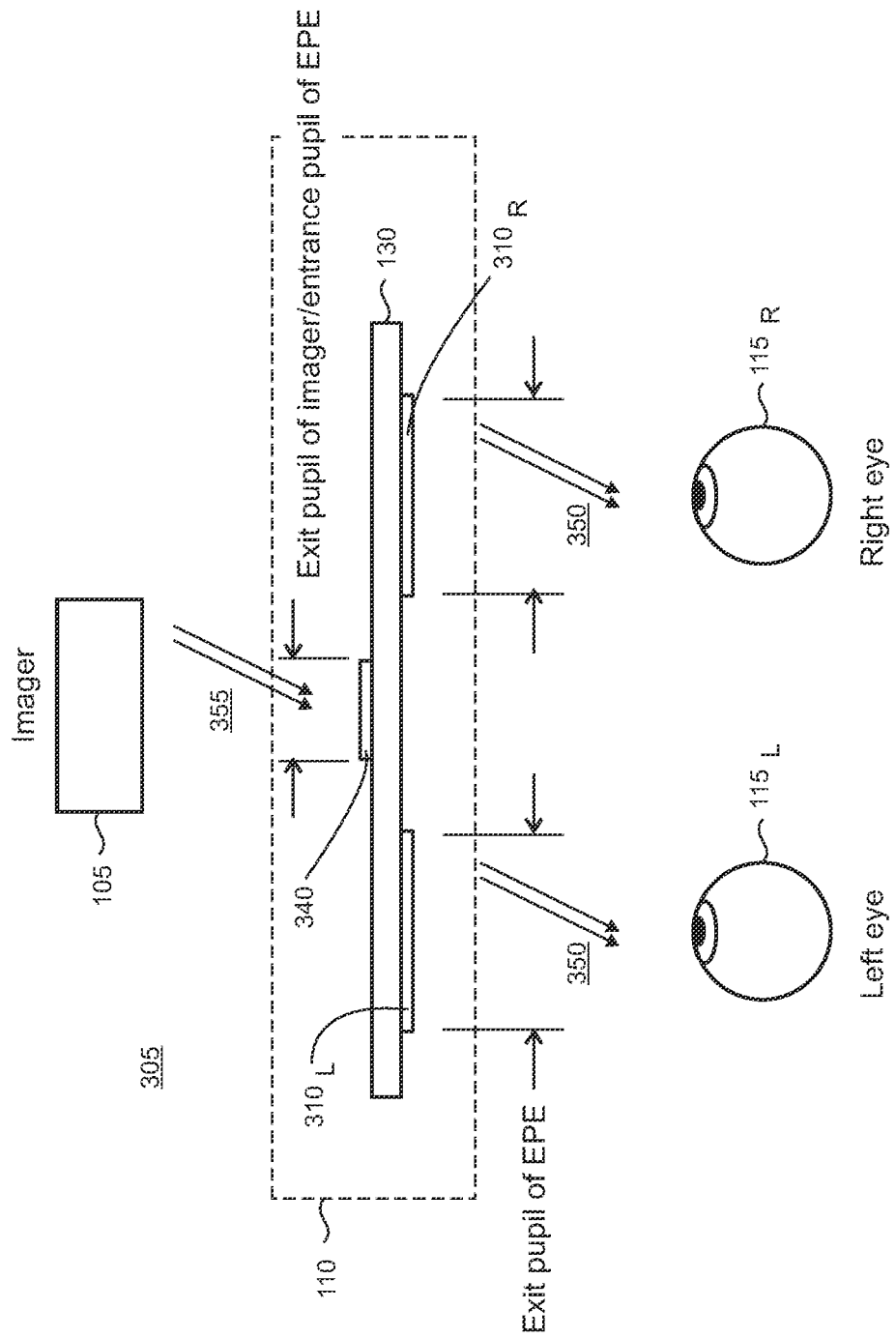
FIG. 3 shows a view of an illustrative exit pupil expander.

FIG. 3 shows a view of an illustrative exit pupil expander (EPE) 305. EPE 305 receives one or more input optical beams from the imager 105 as an entrance pupil for holographic image light to produce one or more output optical beams with expanded exit pupil in one or two directions relative to the input. The expanded exit pupil typically facilitates a virtual display to be sufficiently sized to meet the various design requirements, such as eyebox size, image resolution, field of view (FOV), and the like, of a given optical system while enabling the imager and associated components to be relatively light and compact.

The EPE 305 is configured, in this illustrative example, to provide binocular operation for both the left and right eyes which may support binocular or stereoscopic viewing. Components that may be utilized for binocular or stereoscopic operation such as scanning mirrors, lenses, filters, beam splitters, MEMS (micro-electromechanical system) devices, or the like are not shown in FIG. 3 for sake of clarity in exposition. The EPE 305 utilizes two out-coupling gratings, $310_L$ and $310_R$ that are supported on a waveguide 130 and a central in-coupling grating 340.

The in-coupling and out-coupling gratings may be configured using multiple DOEs and may further include one or more intermediate DOEs (not shown) as described below. The DOEs may be arranged in various configurations on the waveguide, for example, on the same side or different sides and may further be single- or double-sided. While the EPE 305 is depicted as having a planar configuration, other shapes may also be utilized including, for example, curved or partially spherical shapes, in which case the gratings disposed thereon may be non-co-planar.

As shown in FIG. 3, exemplary output beams 350 from the EPE 305 are parallel to the exemplary input beams 355 that are output from the imager 105 to the in-coupling grating 340. In some implementations, the input beams are collimated such that the output beams are also collimated, as indicated by the parallel lines in the drawing. Typically, in waveguide-based combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread.

The collimated inputs and outputs result in holographic images displayed by the optical system 110 to be focused at infinity. Therefore, in some optical system designs the images can be set at a closer distance (e.g., 2 m) for better visual comfort for the user by employing a negative lens (e.g., −0.5 diopters) over the entire eyebox. For an unperturbed see-through experience, such a lens needs to be compensated by its conjugate that is placed on the real-world side of the waveguide.

Figure 4:
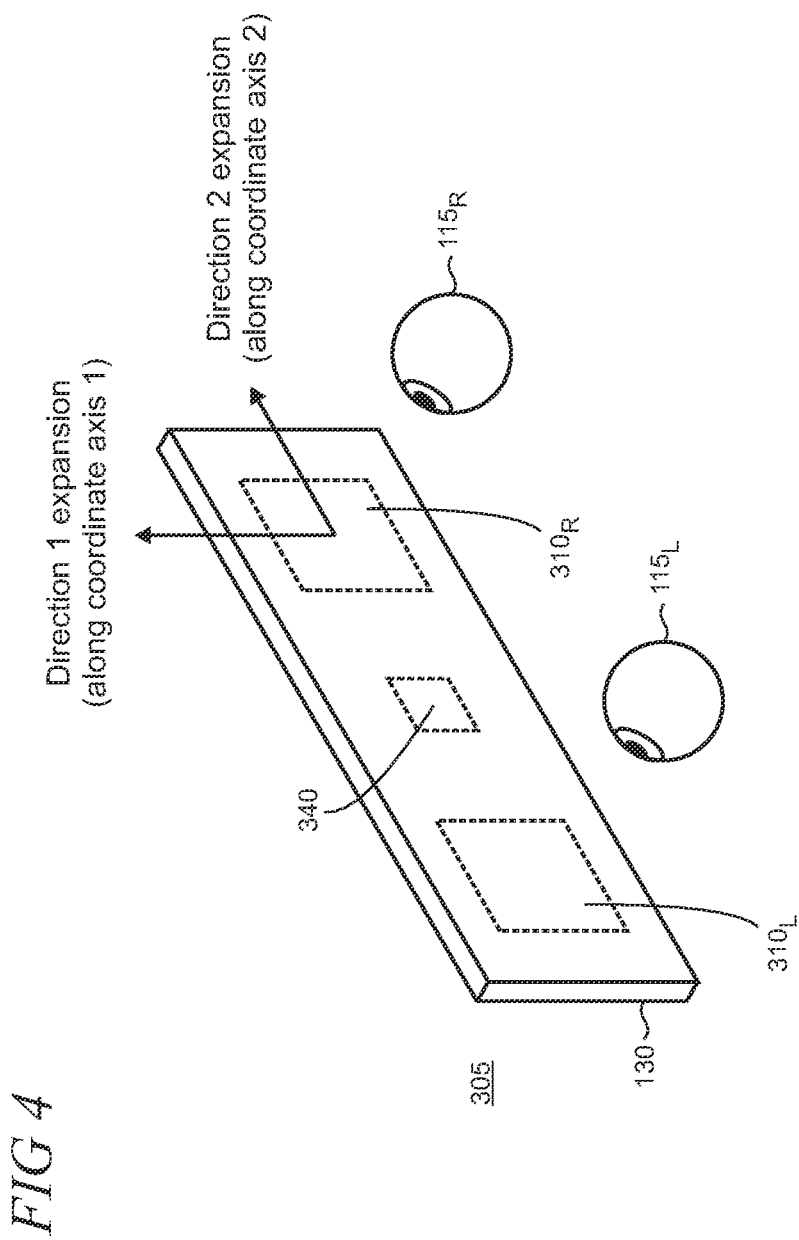
FIG. 4 shows a view of an illustrative exit pupil expander in which the exit pupil is expanded along two directions of the field of view (FOV)

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "left," "right," "up," "down," "direction," "horizontal," and "vertical" are used primarily to establish relative orientations in the illustrative examples shown and described herein for ease of description. These terms may be intuitive for a usage scenario in which the user of the near-eye display system device is upright and forward facing, but less intuitive for other usage scenarios. The listed terms are not to be construed to limit the scope of the configurations (and usage scenarios therein) of near-eye display features utilized in the present arrangement.

Figure 5:
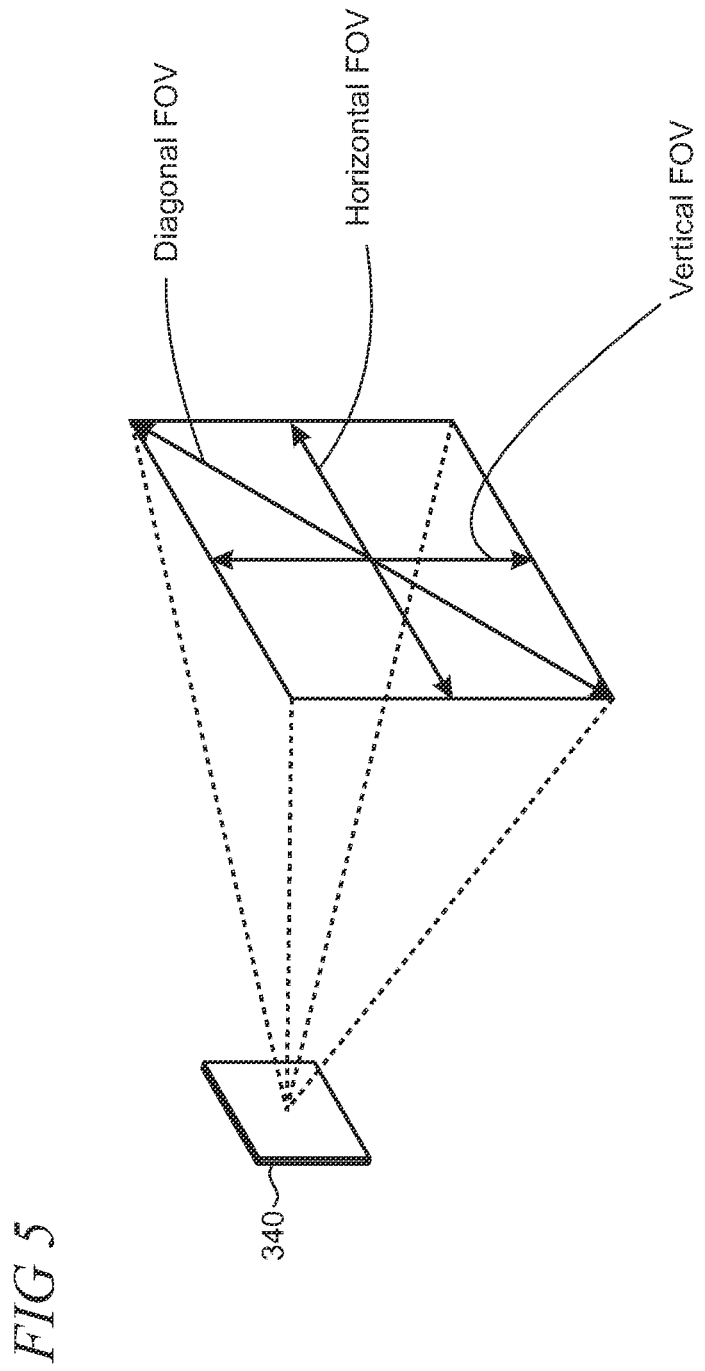
FIG. 5 shows an illustrative input to an exit pupil expander in which the FOV is described by angles in horizontal, vertical, or diagonal orientations.

The entrance pupil to the EPE 305 at the in-coupling grating 340 is generally described in terms of field of view (FOV), for example, using horizontal FOV, vertical FOV, or diagonal FOV as shown in FIG. 5. The FOV is typically a parameter of interest that can vary by application. For example, an HMD device for one application may be designed with a diagonal FOV of 34 degrees while another may have a 52-degree FOV. Some non-planar waveguide-based HMD devices have been proposed with FOVs of more than 70 degrees. It is noted that FOV is just one of many parameters that are typically considered and balanced by HMD designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

FIG. 6 shows an illustrative example of a visor 600 that incorporates an internal near-eye display system that is used in a head-mounted display (HMD) device 605 worn by a user 615. The visor 600, in this example, is sealed to protect the internal near-eye display system. The visor 600 typically interfaces with other components of the HMD device 605 such as head-mounting/retention systems and other subsystems including sensors, power management, controllers, etc., as illustratively described in conjunction with FIGS. 25 and 26. Suitable interface elements (not shown) including snaps, bosses, screws and other fasteners, etc. may also be incorporated into the visor 600.

The visor 600 includes see-through front and rear shields, 604 and 606 respectively, that can be molded using transparent materials to facilitate unobstructed vision to the optical displays and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 705 shown in the disassembled view in FIG. 7.

The sealed visor 600 can physically protect sensitive internal components, including a near-eye display system 702 (shown in FIG. 7), when the HMD device is operated and during normal handling for cleaning and the like. The near-eye display system 702 includes left and right waveguide displays 710 and 715 that respectively provide virtual world images to the user's left and right eyes for mixed- and/or virtual-reality applications. The visor 600 can also protect the near-eye display system 702 from environmental elements and damage should the HMD device be dropped or bumped, impacted, etc.

Figure 7:
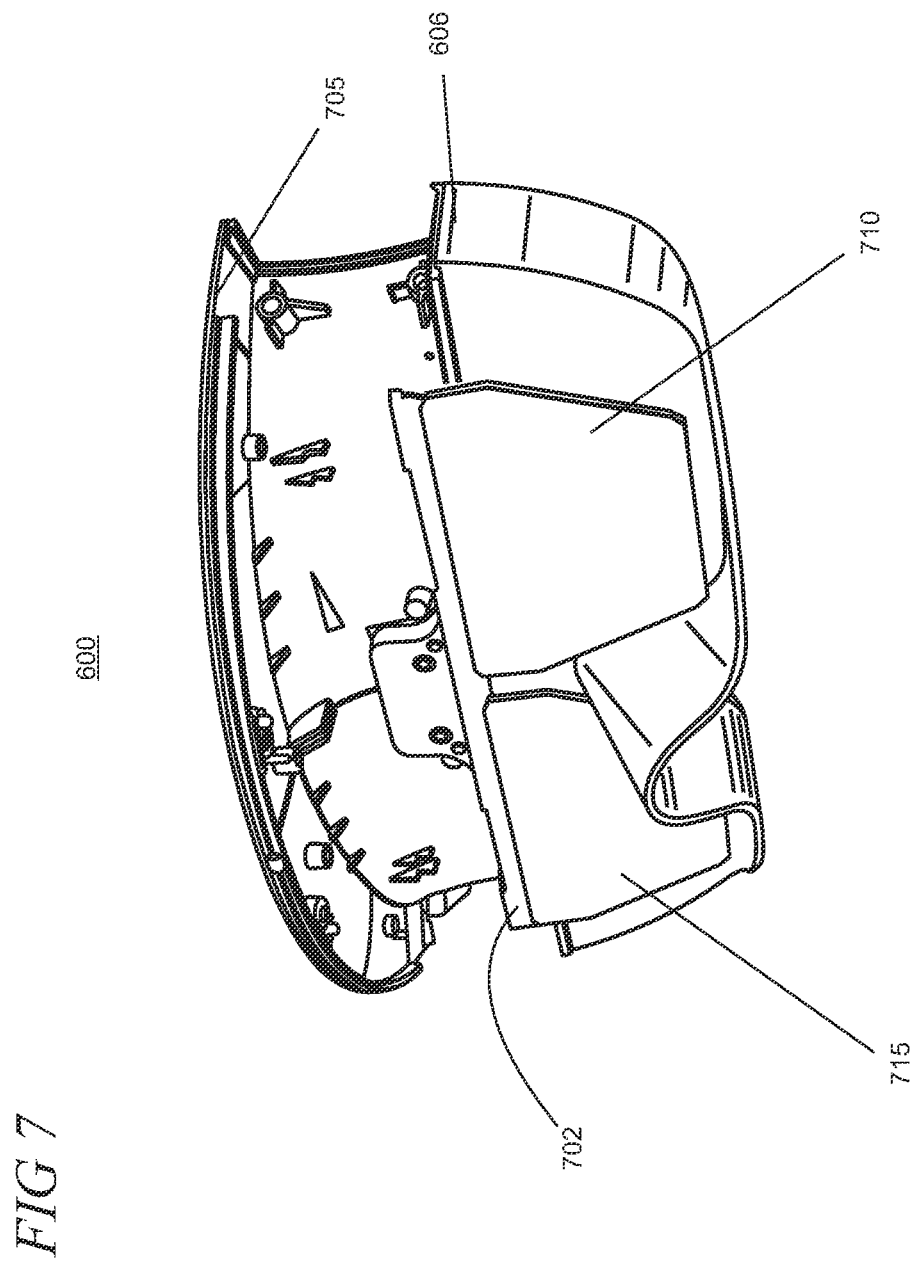
FIG. 7 shows a partially disassembled view of the sealed visor.

As shown in FIG. 7, the rear shield 606 is configured in an ergonomically suitable form to interface with the user's nose, and nose pads and/or other comfort features can be included (e.g., molded-in and/or added-on as discrete components). The sealed visor 600 can also incorporate some level of optical diopter curvature (i.e., eye prescription) within the molded shields in some cases.

Figure 8:
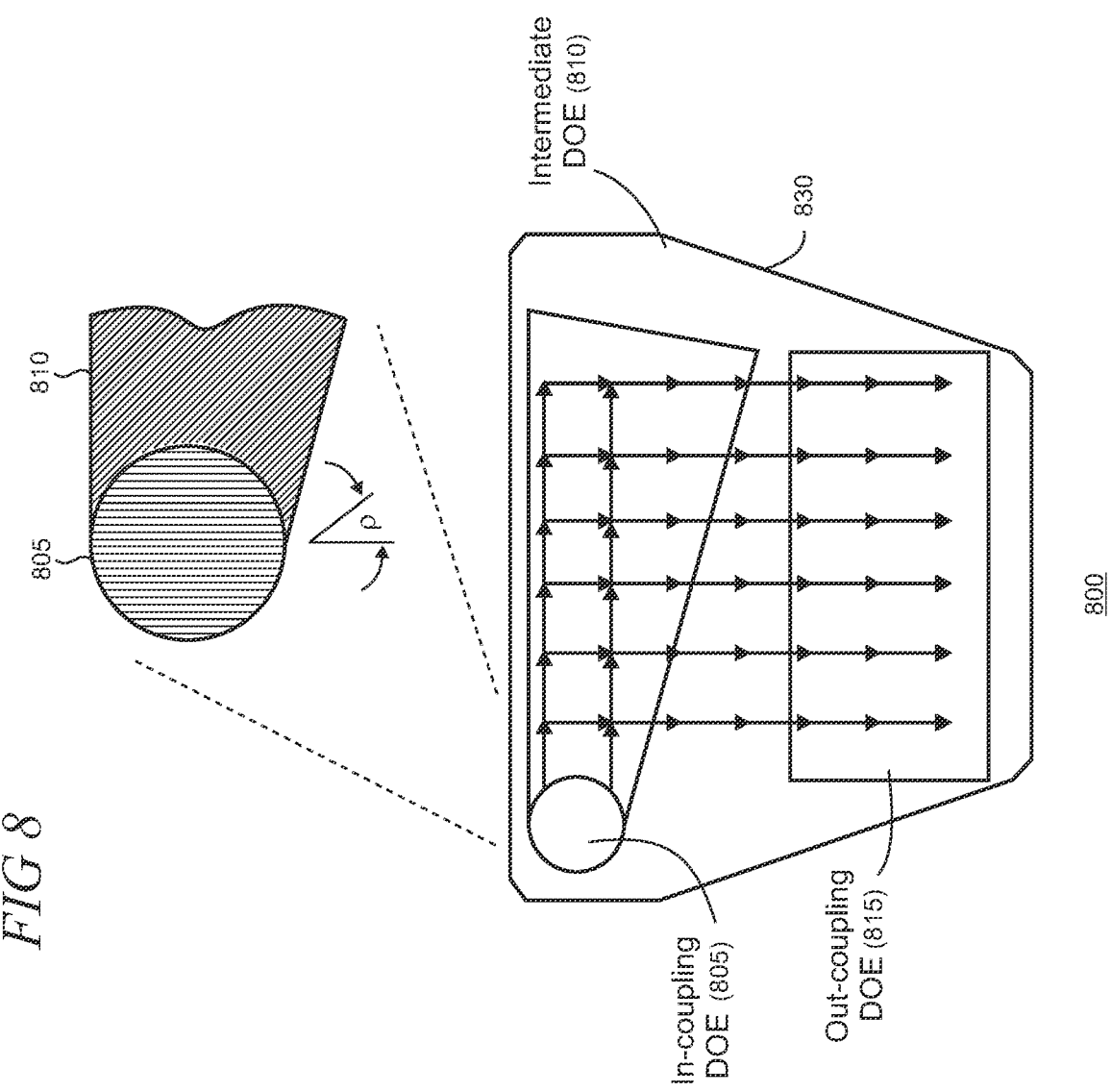
FIG. 8 shows an illustrative arrangement of diffractive optical elements (DOEs) configured for in-coupling, exit pupil expansion in two directions, and out-coupling.

FIG. 8 shows an illustrative waveguide display 800 having multiple DOEs that may be used with, or incorporated as a part of, a see-through waveguide 830 to provide in-coupling, expansion of the exit pupil in two directions, and out-coupling. The waveguide display 800 may be utilized in an exit pupil expander that is included in the near-eye display system 702 (FIG. 7) to provide holographic images to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide display 800 includes an in-coupling DOE 805, an out-coupling DOE 815, and an intermediate DOE 810 that couples light between the in-coupling and out-coupling DOEs. The in-coupling DOE 805 is configured to couple image light comprising one or more imaging beams from an imager 105 (FIG. 1) into the waveguide. The intermediate DOE 810 expands the exit pupil in a first direction along a first coordinate axis (e.g., horizontal).

The out-coupling DOE 815 expands the exit pupil in a second direction along a second coordinate axis (e.g., vertical) and couples light out of the waveguide to the user's eye (i.e., outwards from the plane of the drawing page). The angle ρ is a rotation angle between the periodic lines of the in-coupling DOE 805 and the intermediate DOE 810 as shown. As the light propagates in the intermediate DOE 810 (horizontally from left to right in the drawing), it is also directed (in the downward direction) to the out-coupling DOE 815. Accordingly, the intermediate DOE may also be referred to as a "redirection" DOE. In alternative implementations, the intermediate and out-coupling DOEs may integrated so that the exit pupil expansion function of the intermediate DOE is combined with the exit pupil expansion and out-coupling functions of the out-coupling DOE in a single component. In such alternative implementations, utilization of only an in-coupling DOE and integrated out-coupling DOE, without the need for the intermediate DOE, reduces component count which may improve device packaging flexibility and lower costs.

While DOEs are shown in this illustrative example using a single in-coupling DOE disposed to the left of the intermediate DOE 810, which is located above the out-coupling DOE, in some implementations, the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation. The combination of DOEs 805, 810, 815 and the see-through waveguide 830 may be referred to as a "plate," particularly in applications where multiple waveguides and corresponding DOEs are used to implement a full-color display.

Figure 9:
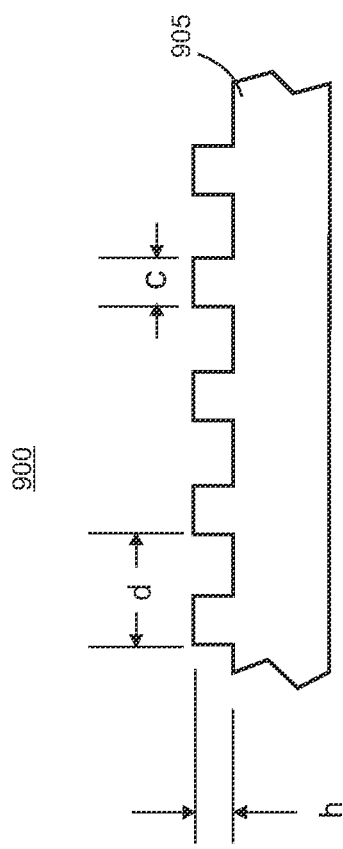
FIG. 9 shows a profile of a portion of an illustrative diffraction grating that has straight gratings.
Figure 10:
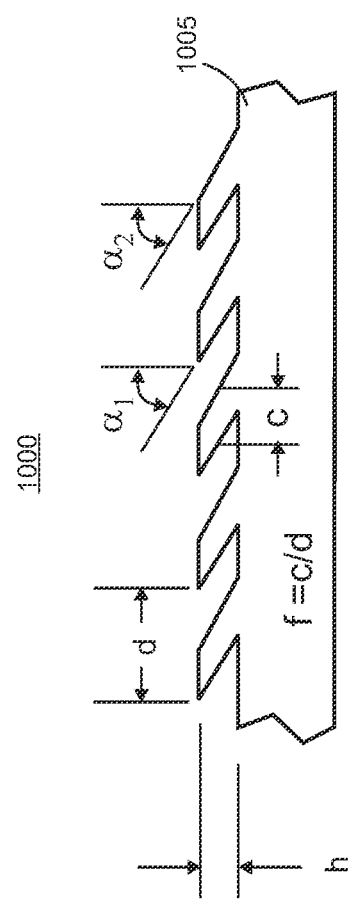
FIG. 10 shows a profile of a portion of an illustrative diffraction grating that has asymmetric or slanted gratings.

The grating features used in the DOEs in the waveguide display 800 may take various suitable forms. For example, FIG. 9 shows a profile of straight (i.e., non-slanted) grating features 900 (referred to as grating bars, grating lines, or simply "gratings"), that are formed in a substrate 905. By comparison, FIG. 10 shows grating features 1000 formed in a substrate 1005 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 9 and 10, the grating period is represented by d, the grating height by h, bar width by c, and the filling factor by f, where f=c/d. The slanted gratings in FIG. 10 may be described by slant angles $\alpha_1$ and $\alpha_2$.

Figure 11:
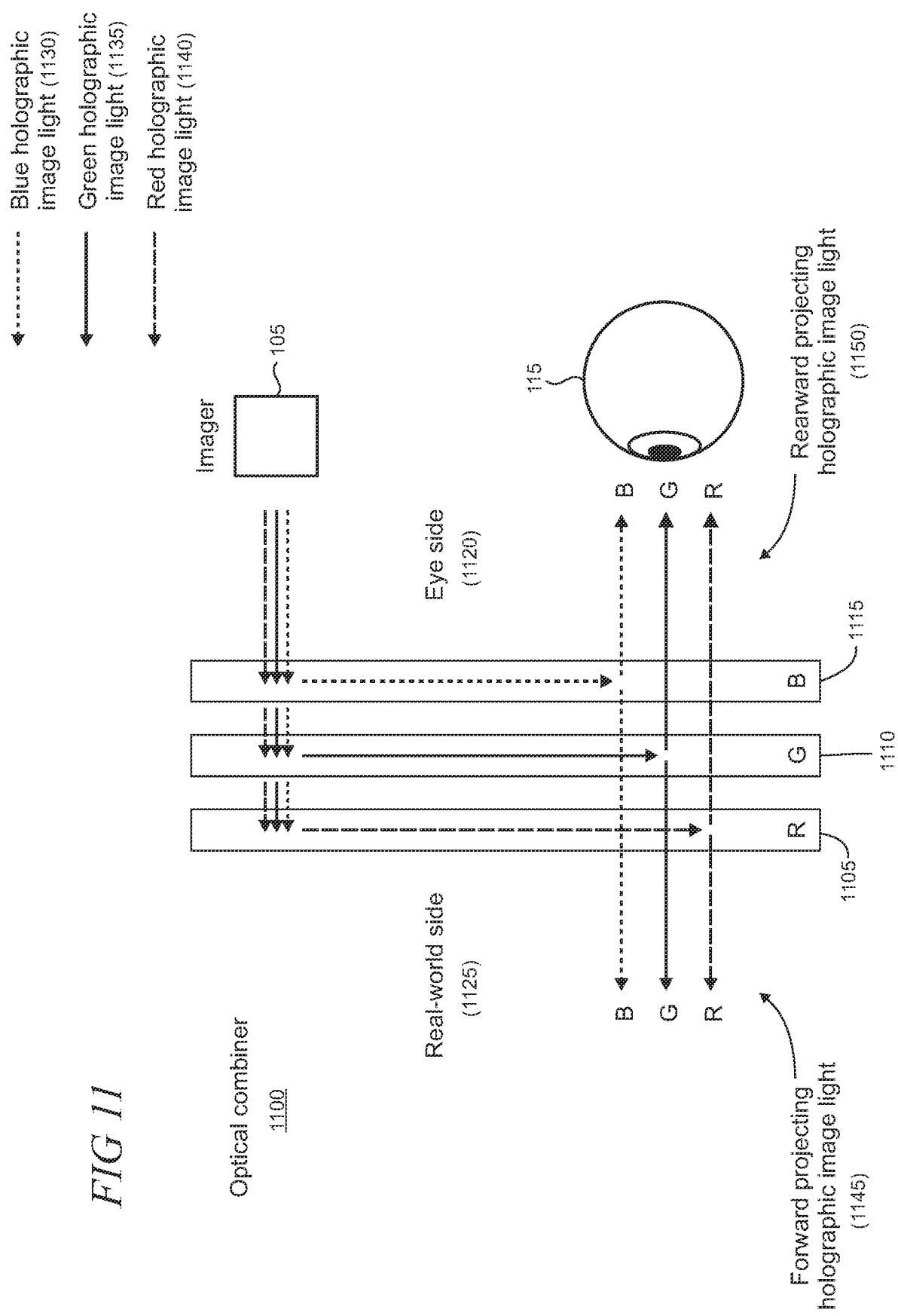
FIG. 11 shows a side view of an illustrative assembly of three waveguides with integrated DOEs that are stacked as plates in an optical combiner, in which each waveguide handles a different color in an RGB (red, green, blue) color model.

FIG. 11 shows a side view of an illustrative assembly of three waveguides on which DOEs are disposed that are stacked to form an optical combiner 1100 (e.g., as part of the optical system 110 shown in FIG. 1 and described in the accompanying text). Each waveguide and its associated DOEs, as described above with reference to FIG. 8, together may be referred to as plates and are respectively identified by reference numerals 1105, 1110, and 1115. The in-coupling, intermediate and out-coupling DOEs (not shown in FIG. 11 for the sake of clarity in presentation) are typically disposed on a surface of a waveguide that faces the eye side of the optical combiner. The eye side is indicated by reference numeral 1120 and the real-world side of the optical combiner is indicated by reference numeral 1125.

Each plate 1105, 1110, and 1115 respectively handles a different color in an RGB (red, green, blue) color model within some input angular range that corresponds to the FOV of a given HMD device. In typical implementations, the red wavelength range is from 600 nm to 650 nm, the green wavelength range is from 500 nm to 550 nm, and the blue wavelength range is from 430 nm to 480 nm. Other wavelength ranges are also possible. The component colors of the RGB color model form full color holographic images when added together in the optical combiner in various ways to thereby produce a broad array of different colors.

The stacked plates 1105, 1110, and 1115 may be referred to collectively as a waveguide assembly which functions as an optical combiner (in the discussion that follows, the terms "waveguide assembly" and "optical combiner" are considered synonymous unless statements or context indicate otherwise). The color order within the assembly can vary by implementation and other color models may also be used to meet the needs of a particular application. Use of the waveguide assembly enables holographic images to be guided to the eye 115 across a full-color spectrum. Utilization of a single plate for each component in the color model can benefit display quality by reducing, for example, color non-uniformities over the full extent of the eyebox. The improved color uniformity may need to be balanced against the typical increase in size and weight of multi-plate display systems. Plate alignment and waveguide surface flatness may also need to be kept within close tolerances to avoid reductions in MTF (modulation transfer function) in some cases.

The distance between adjacent plates of the waveguide assembly can be, for example, between approximately 50 micrometers (μm) and 300 μm but is not limited thereto. While not specifically shown, spacers, supports, and/or other structures can be utilized to provide the desired spacing among adjacent waveguides. Air gaps between the stacked plates 1105, 1110, and 1115 are required to produce the TIR condition (FIG. 2). Such gaps also allow for additional potential filtering in between plates for enhanced performance (such as spectral and polarization filtering) in some implementations.

In alternative implementations, assemblies with more or fewer plates can be utilized, for example, for monochromatic and reduced-color spectrum applications. A single plate may be used in some applications, while other applications can use other plate counts. Some colors may also be supported using two or more plates. For example, an RGBG arrangement may be used in which an extra plate provides additional green light which may increase display luminance in some cases.

As shown in the drawing, holographic image light is received and propagates through the optical combiner 1100. For a given angular range within the FOV, light for each color component 1130, 1135, and 1140 provided by the imager 105 is in-coupled into respective plates 1115, 1110, and 1105 using respective individual in-coupling DOEs. The holographic light for each color propagates through the respective intermediate DOEs and the waveguides in TIR and is out-coupled by respective out-coupling DOEs to the user's eye 115 with an expanded pupil in the horizontal and vertical directions.

The in-coupling DOE for each plate 1105, 1110, and 1115 is configured to in-couple light within an angular range described by the FOV for the virtual portion of the display and within a particular wavelength range. Light outside the wavelength range passes through the plate. For example, the blue holographic image light 1130 is outside the range of wavelength sensitivity of both of the in-coupling DOEs in the red plate 1105 and green plate 1110. The blue holographic image light therefore passes through the red and green plates to reach the in-coupling DOE in the blue plate 1115 where it is in-coupled, propagated in TIR within the waveguide of the plate, expanded in a horizontal direction in the intermediate DOE, propagated to the out-coupling DOE where it is expanded in a vertical direction, and out-coupled to the user's eye 115 with an expanded exit pupil relative to the input.

Holographic image light may project in forward and backward directions from the out-coupling DOEs in each plate. The distribution between forward and rearward projection is typically dependent on FOV angle, but on average is equally split between the two directions. Forward-projecting light is indicated by reference numeral 1145 in FIG. 11 and is directed towards the real-world side 1125 of the optical combiner 1100. Rearward-projecting light is indicated by reference numeral 1150 and is directed towards the eye side 1120 of the optical combiner.

Unlike the rearward projecting light 1150, the forward-projecting holographic image light 1145 is typically unusable and may thus be considered wasted light in some cases. In addition, the forward-projecting holographic image light may be visible by others which can be a nuisance in some applications or represent a security risk in other applications where it is desired that an HMD user's location is not revealed, for example at nighttime or in dark environments.

As shown in FIG. 11, all the colors from the imager 105 are coupled to each of the plates 1105, 1110, and 1115 in the optical combiner 1100. Such arrangement can give rise to cross-coupling or crosstalk among the color components which can negate some of the benefits of a single plate per color in some cases and lower image uniformity. For example, color cross-coupling can cause aberrations in the display which may be manifested, for example, as sharp-edged defects.

Existing solutions for reducing cross-coupling of color components in an optical combiner may include polarization and/or bandpass filters that are placed in the spaces between adjacent plates. While such solutions can provide satisfactory results in some cases, the polarization sensitivity of the DOE gratings may be low such that color cross-coupling is only partially mitigated over parts of the FOV. In addition, ghost images may arise in the display and the overall MTF can be reduced. Bandpass filters may also be only a partially effective solution as they can cause scattering and reduce display contrast. Typical implementations of both the polarization and bandpass filters may undesirably increase size and weight of the optical combiner due to additional structural components that are required.

Figure 12:
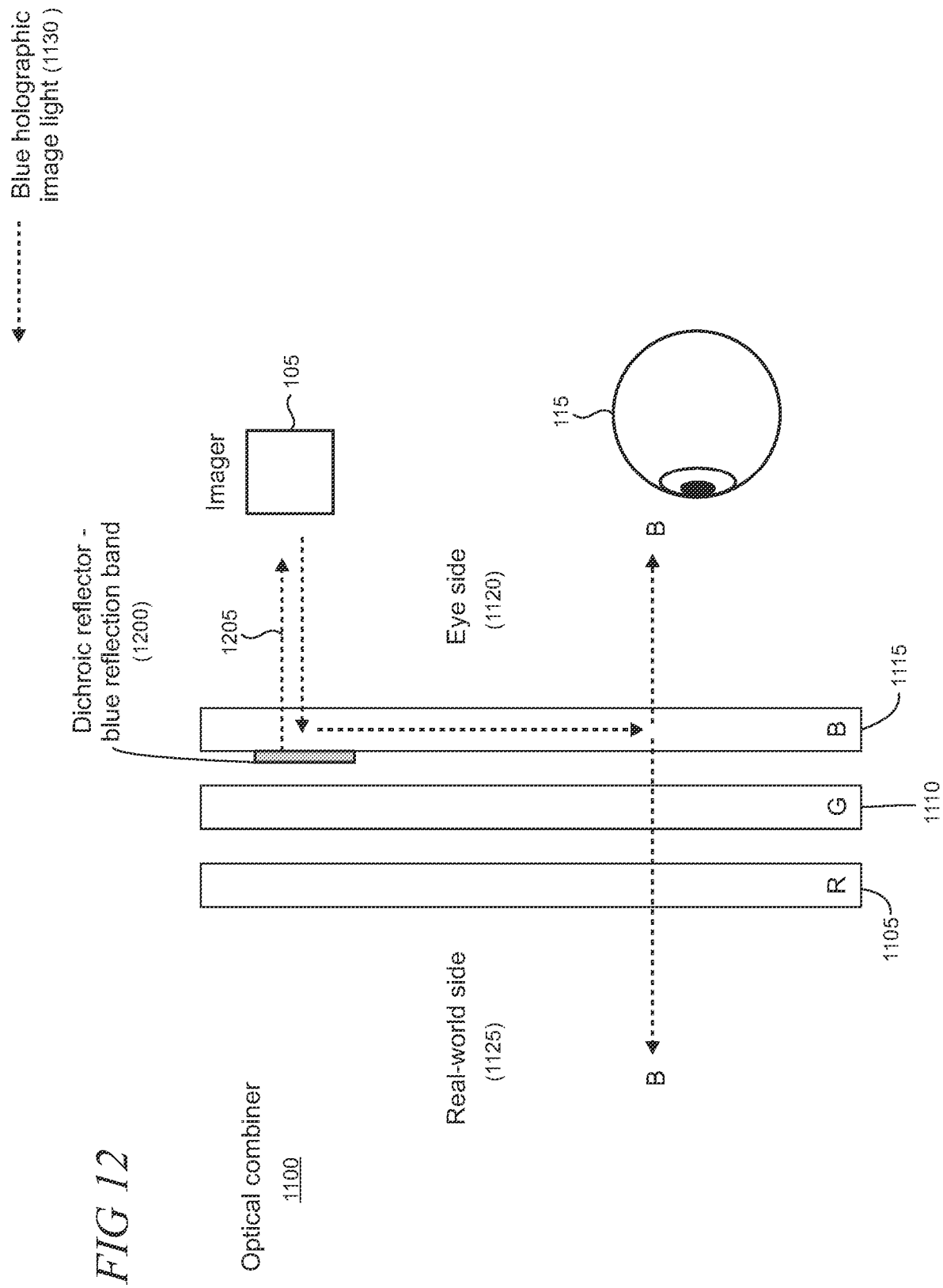
FIG. 12 shows an illustrative dichroic reflector that is disposed on a blue plate of an optical combiner in which the dichroic reflector is configured with a reflection band that is operative on the blue light component of an RGB color model.

FIG. 12 shows an illustrative example of a dichroic reflector 1200 that is arranged in accordance with the principles of the current invention. The dichroic reflector comprises a thin film coating that is disposed behind the in-coupling DOE on a plate (the blue plate in this particular example). The thin film coating is a reflective coating that is configured to reflect light within a predetermined wavelength range around the blue light component of the RGB color space.

By having dichroic characteristics, the reflector 1200 reflects light having a range of wavelengths within the specified reflection band while transmitting different specified ranges of wavelengths outside the reflection band over a range of angles of interest. The predetermined reflection range is referred to as the "reflection band," however, the term "bandpass" may also be utilized and the terms are considered synonymous herein. The predetermined transmission ranges are referred to as the "transmission bands." Typically, there are two transmission bands across the visible light spectrum of 400 to 650 nm on either side of the reflection band of a dichroic reflector.

The bandpass and transmission characteristics of the dichroic reflector can be tailored by design to be consistent over a range of angles associated with the FOV of the display to block blue light from the imager 105 from reaching the green and red plates in the optical combiner 1100. The degree of reflectance and the width of the bandpass that is implemented in the dichroic reflector 1200 in the reflection band can vary by implementation.

As shown in the drawing, blue holographic image light 1130 from the imager 105 is in-coupled to the blue plate 1115 and propagates downward in the waveguide where it is out-coupled towards both the real-world side 1125 and the eye side 1120 of the optical combiner 1100 to the user's eye 115. Blue holographic image light that is not in-coupled is reflected back towards the eye side, as indicated by reference numeral 1205, to block the blue light from being in-coupled at the green and red plates 1110 and 1105 and thereby reduce cross-coupling of the blue holographic image light with the other color components.

Figure 13:
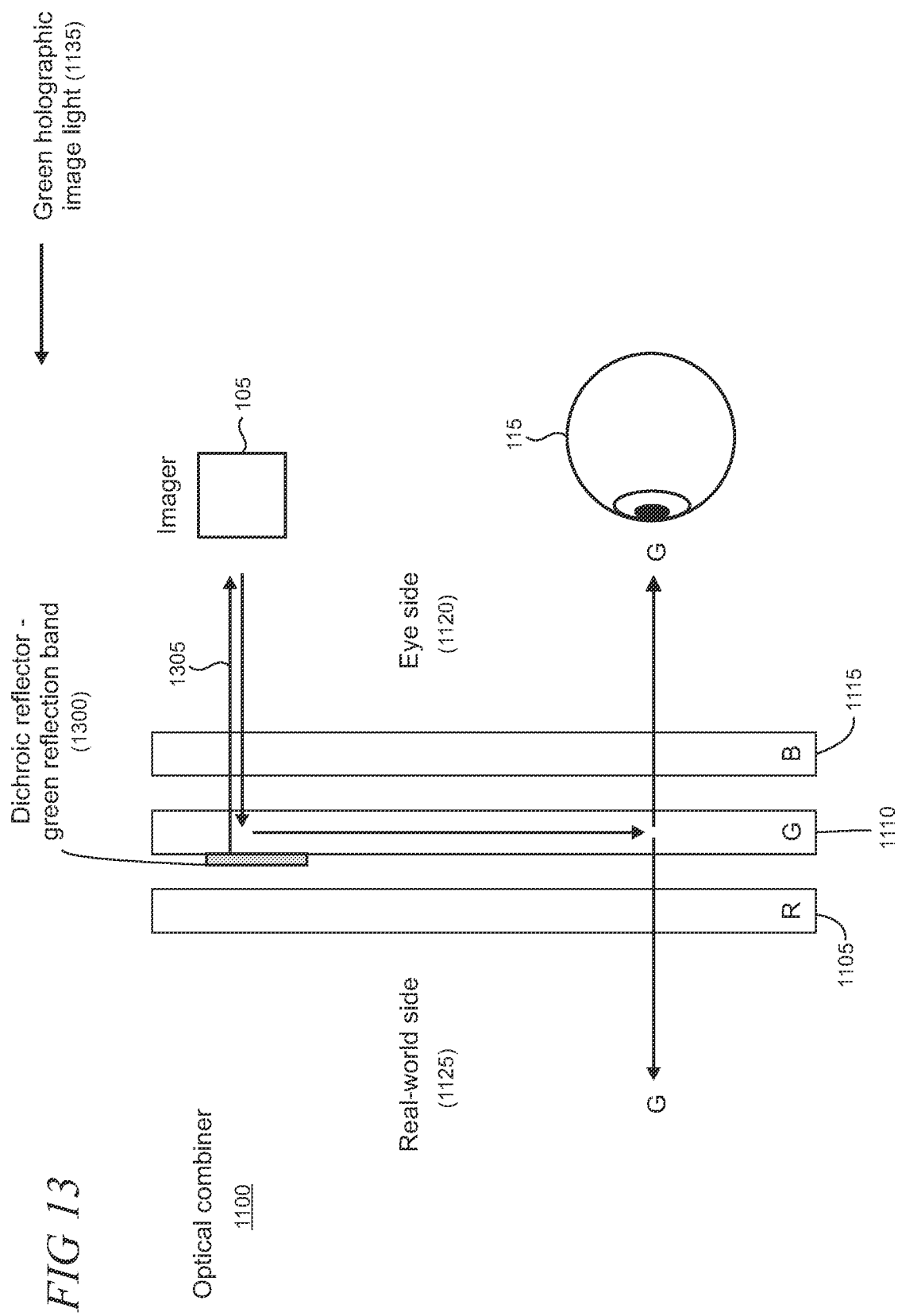
FIG. 13 shows an illustrative dichroic reflector that is disposed on a green plate of an optical combiner in which the dichroic reflector is configured with a reflection band that is operative on the green light component of an RGB color model.

FIG. 13 shows an illustrative dichroic reflector 1300 that is disposed on a green plate 1110 of the optical combiner 1100. The dichroic reflector is similar in construction, composition, and operation to the reflector 1200 shown in FIG. 12 for the blue plate, however, the bandpass is selected for the green light component of the RGB color model. As shown, green holographic image light 1135 from the imager 105 is in-coupled to the green plate and propagates downward in the waveguide where it is out-coupled towards both the real-world side 1125 and the eye side 1120 of the optical combiner 1100 to the user's eye 115. Green holographic image light that is not in-coupled is reflected back towards the eye side, as indicated by reference numeral 1305, to block the green light from being in-coupled at the red plate 1105 and thereby reduce cross-coupling of the green holographic image light.

In the illustrative example of the optical combiner 1100, the red plate 1105 is adjacent to the real-world side. In alternative configurations for the optical combiner, a different plate order from that utilized in this example may be utilized. For example, if the red plate is adjacent to the eye side, then it may be desirable to locate a dichroic reflector having a red light bandpass on the red plate behind the in-coupling DOE to thereby block red holographic image light from reaching the green and/or blue plates.

Depending on the requirements of a given application, one or more dichroic reflectors may be utilized on various different ones of the plates in the optical combiner 1100. For example, depending on the FOV of a given display design, characteristics of the imager (e.g., wavelengths and bandwidth of the individual color components, etc.), and the application environment of the HMD device in which the device is used (e.g., commercial, consumer, industry, military, etc.), some combinations of colors may be more apt to cause chromatic aberrations due to cross-coupling. Accordingly, the order and arrangement of the dichroic reflectors on particular plates, and the specification of reflector characteristics, can vary as needed to suit a particular application. Two alternative illustrative arrangements are shown in FIGS. 14 and 15 and described in the accompanying text below.

Figure 14:
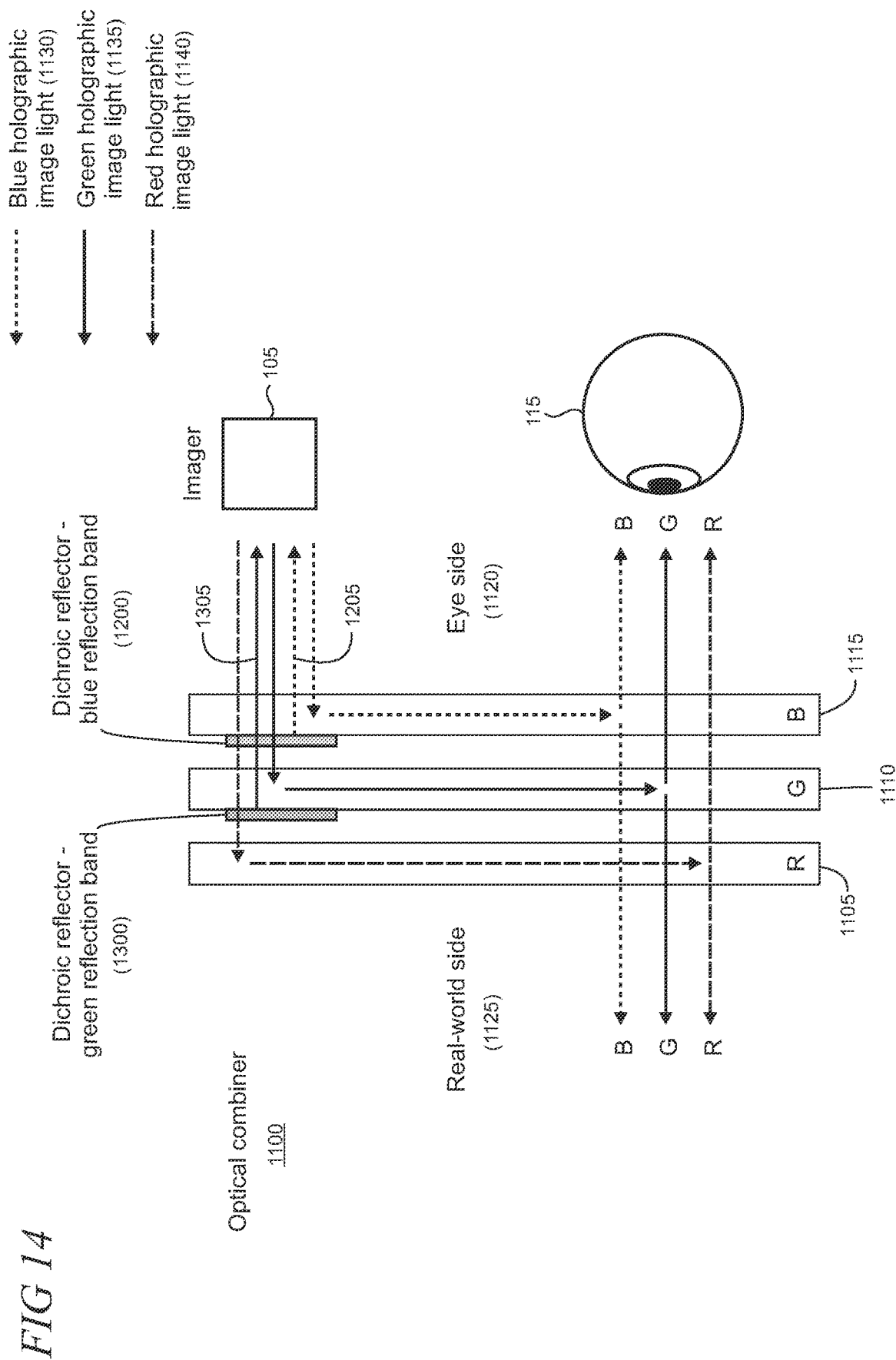
FIG. 14 shows illustrative dichroic reflectors that are respectively disposed on the blue and green plates of an optical combiner.

FIG. 14 shows illustrative dichroic reflectors 1200 and 1300 that are respectively disposed on the blue and green plates 1115 and 1110 of the optical combiner 1100. As shown, the dichroic reflectors 1200 and 1300 respectively reflect blue and green holographic image light 1130 and 1135 to thereby block that light from reaching the red plate 1105. The reflected holographic image light is indicated by reference numeral 1205 for the blue light and numeral 1305 for the green light in the drawing. The dichroic reflector 1200 on the blue plate also blocks blue holographic image light from the green plate 1110.

Figure 15:
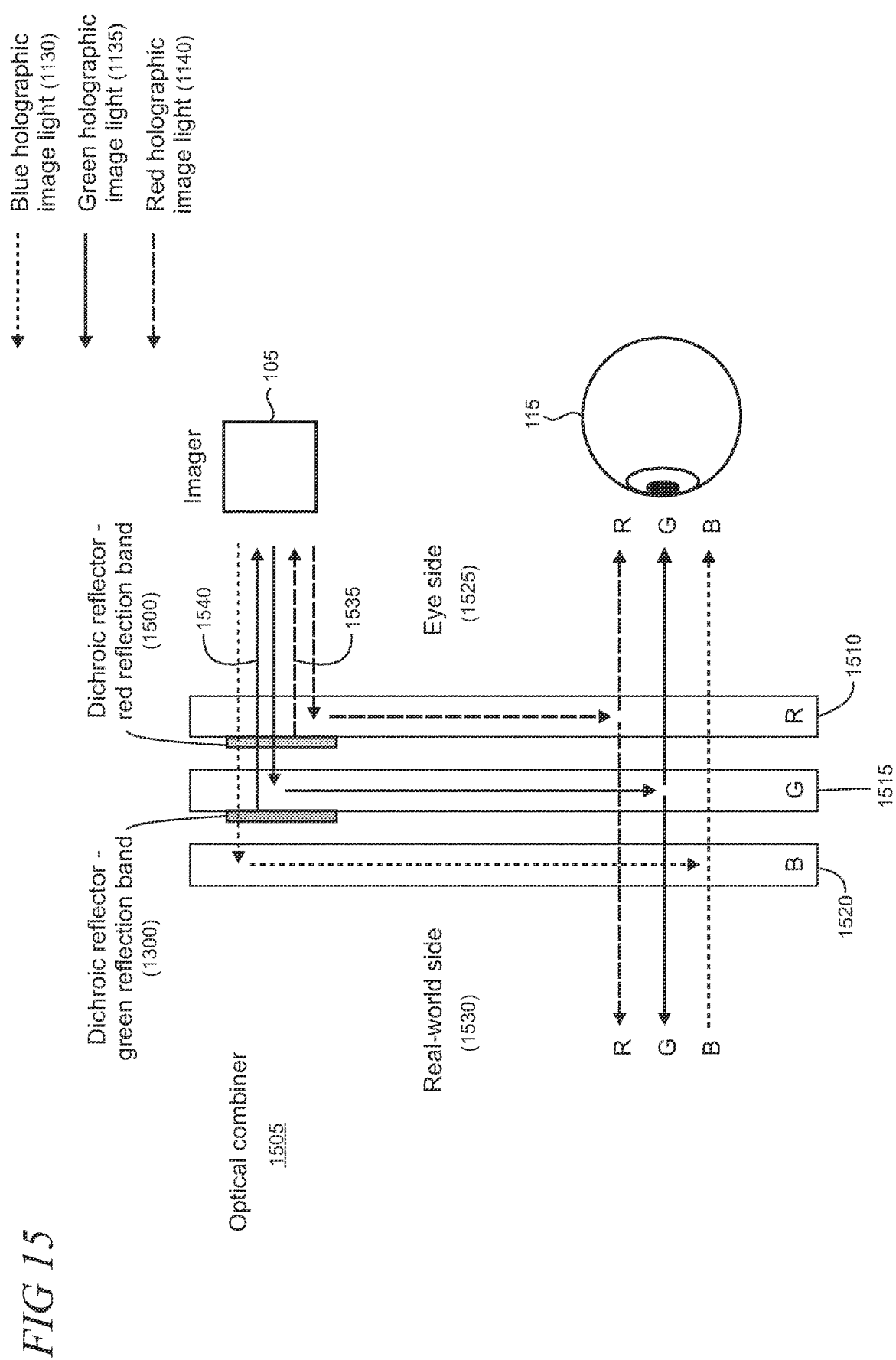
FIG. 15 shows illustrative dichroic reflectors that are respectively disposed on the red and green plates of an optical combiner.

FIG. 15 shows illustrative dichroic reflectors 1500 and 1300 that are respectively disposed on the red and green plates 1510 and 1515 of an optical combiner 1505. The optical combiner in this illustrative example has a different plate order from the optical combiner 1100 shown in FIG. 11 as the red plate 1510 is adjacent to the eye side 1525 and the blue plate 1520 is adjacent to the real-world side 1530 of the optical combiner. The dichroic reflector 1500 is similar in construction, composition, and operation to those reflectors described above that are adapted to reflect blue and green light, however the bandpass for this reflector is selected for the red component of the RGB color model.

As shown in the drawing, the dichroic reflectors 1500 and 1300 respectively reflect red and green holographic image light 1140 and 1135 to thereby block that light from reaching the blue plate 1520 (the reflected holographic image light is indicated by reference numeral 1535 for the red light and numeral 1540 for the green light). The dichroic reflector 1500 on the red plate 1510 also blocks red holographic image light from the green plate 1515.

FIG. 16 shows an illustrative dichroic reflector 1600 that is disposed on a blue plate 1115 of the optical combiner 1100 in which the dichroic reflector is configured with a reflection band that is operative on the blue light component of an RGB color model. The dichroic reflector is implemented as a thin film coating on the waveguide of the blue plate behind the out-coupling DOE (not shown) and may be similar, in some cases, in construction, composition, and operation to the dichroic reflector 1200 with the blue reflection band, described above with reference to FIG. 12, that is located behind the in-coupling DOE (not shown) on the blue plate.

In some implementations, it may be desirable to implement a dichroic coating with a blue reflection band as a continuous thin film over some or all of the backside surface (i.e., the surface opposite the eye side of the optical combiner) of the waveguide that is provided for the blue plate. In this way, a single continuous dichroic coating is located behind both the in-coupling and out-coupling DOEs in the blue plate. In other implementations, the dichroic reflector 1600 behind the out-coupling DOE may utilize a different composition from that used in the reflector behind the in-coupling DOE on a given plate in the optical combiner. The different compositions can enable the characteristics of the reflectors to be tailored to their specific tasks (i.e., reduction in cross-coupling at the in-coupling DOEs versus reduction in forward light projection at the out-coupling DOEs).

As shown, blue holographic image light 1130 is in-coupled to the blue plate 1115 and propagates downward in the waveguide where it is out-coupled towards both the real-world side 1125 and eye side 1120 of the optical combiner 1100 to the user's eye 115. The out-coupled light in the direction of the real-world side, which is referred to here as "forward-projected" light and indicated by reference numeral 1605, is at least partially reflected by the dichroic reflector 1600 back towards the user's eye 115. The reflected light is indicated by reference numeral 1610. The out-coupled light in the direction of the eye side is indicated by reference numeral 1615.

As the dichroic reflector 1600 is located along the see-through path of the display system (e.g., display system 702 shown in FIG. 7 and described in the accompanying text), in some implementations it will at least partially reflect a portion of real-world light that is associated with real-world images and ambient light from the environment which is incident on the reflector. The incident real-world light is indicated by reference numeral 1620 and the reflected real-world light is indicated by reference numeral 1625. The reflected real-world light reduces the real-world light 1630 that is transmitted by the see-through display to the user's eye. Use of the dichroic reflector may also affect light sources and/or sensor functions in an optical eye tracking system in applications where such systems are utilized.

The reflectance characteristics of the dichroic reflector 1600 and their impact on real-world light transmission are typically selected and managed as part of a design process in which various competing factors are balanced. For example, increasing the sensitivity of the dichroic reflectors to wider FOV angles may increase light security but result in wider bandpass and therefore decrease see-through transmission. Increasing see-through transmission by decreasing reflectivity of the dichroic reflector 1600 will typically result in increased forward-projection of holographic image light. It will be appreciated that the specific balance between light security of forward-projected holographic image light and see-through transmission may be implemented as needed to meet particular application requirements.

While FIG. 16 shows the blue plate 1115 having a dichroic reflector 1600 that is configured to reflect blue holographic image light, it will be appreciated that a reflector with a suitable reflection band can be utilized on the green plate 1110 and/or the red plate 1105. Other configurations may also be utilized as shown in FIG. 17 in which the optical combiner 1100 is illustratively configured with dichroic reflectors 1705, 1710, and 1600 that respectively are disposed on the backsides of the plates 1110, 1105, and 1115. Typically, the dichroic reflectors are individually tuned to a reflection band that matches the particular plate (i.e., red, green, blue) on which they are located. In alternative embodiments, a single suitably configured dichroic reflector can be utilized on any one of the plates (not shown), or dichroic reflectors can be disposed on any two of the plates (also not shown). In some alternative embodiments, the bandpass of a given dichroic reflector may be suitably configured to cover additional light spectrum with the expectation that some reduction in see-through light transmission will also result.

In other alternative embodiments, one or more of the reflectors 1600, 1705, and 1710 can be configured with broadband reflectance characteristics rather than dichroic characteristics. The reflection band of such a broadband reflector may be configured to include much or all of the visible wavelength range over a chosen angular range. A broadband reflector may thus have a bandpass that covers the operating spectrum of the imager (e.g., imager 105 shown in FIG. 1) across an FOV of the display to block forward-projecting holographic imaging light. As see-through transmission may be reduced for some FOV angles as reflectance bandwidth is increased in a given broadband reflector, it may be appreciated that bandpass characteristics can be suitably balanced against see-through transmission to meet particular application requirements.

Figure 18:
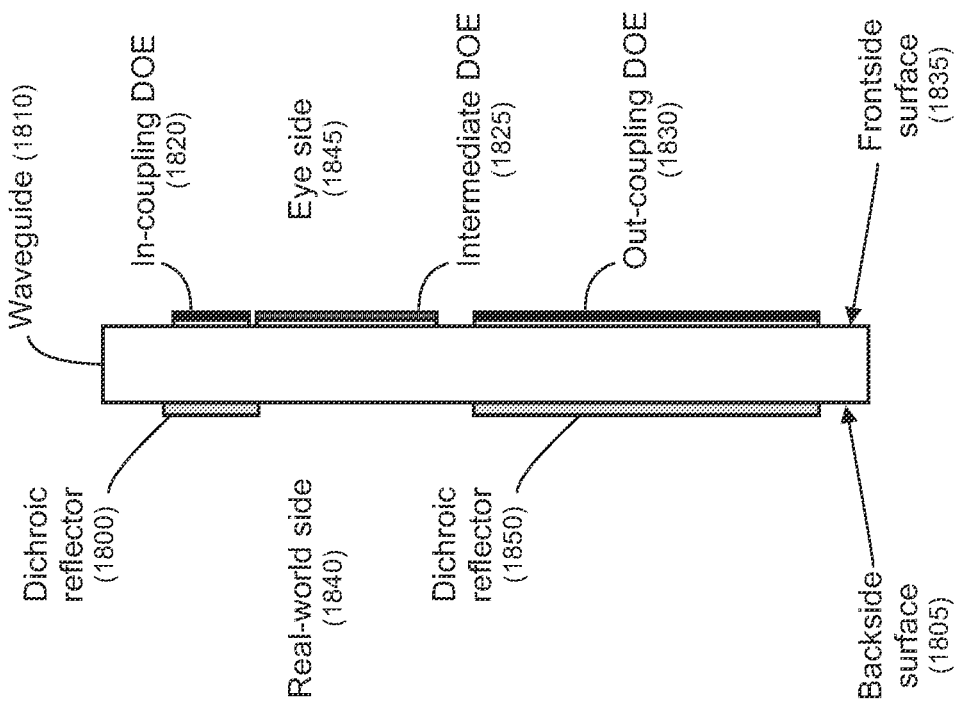
FIG. 18 shows an illustrative dichroic reflector that comprises a thin film that is disposed on a backside surface of a waveguide.

FIG. 18 shows a side view of an illustrative arrangement in which a dichroic reflector 1800 is implemented as a thin film coating that is applied to the backside surface 1805 of a waveguide 1810 that is used as a plate 1815 in an optical combiner. In this example, an in-coupling DOE 1820, intermediate DOE 1825, and out-coupling DOE 1830 are disposed on the frontside surface 1835 of the waveguide. The backside surface of the waveguide faces the real-world side 1840 of the plate and the frontside surface of the waveguide faces the eye side 1845. Accordingly, from the user's perspective on the eye side, the dichroic reflector may be considered as being behind the in-coupling DOE. Likewise, the in-coupling DOE may be considered as being in front of the dichroic reflector.

A second discrete dichroic reflector 1850 may be disposed on the waveguide 1810 behind the out-coupling DOE 1830. In alternative embodiments, the two dichroic reflectors can be combined into a single, continuous thin coating that covers some or all of the backside surface 1805 of the waveguide, as discussed above. The compositions of the dichroic reflectors 1800 and 1850 can be individually tailored for the respective functions performed by the reflectors. The dichroic reflector 1800 is arranged to block holographic image light from reaching adjacent plates at specific waveguides over the angular range provided to the in-coupling DOE. By comparison, characteristics of the dichroic reflector 1850 may need to be balanced against the see-through transmission of the display which is not a parameter that necessarily needs to be addressed by the dichroic reflector behind the in-coupling DOE 1820.

In an illustrative example, the waveguide 1810 comprises a thin glass substrate and the DOEs are fabricated from plastic materials. Glass substrates can provide higher refractive indices compared to other materials which can be beneficial in some HMD device applications, for example, in which the FOV of the virtual display is sought to be maximized. The utilization of glass substrates can also support the application of a thin film coating using processes, as discussed below, that require elevated temperatures that are not suitable for plastic materials.

Applying a thin film coating directly to the backside of the waveguide 1810 to implement one or more of the dichroic reflectors 1800 and 1850 may advantageously ensure that the reflectors are well aligned with the DOEs and thereby provide performance of the system that meets the desired design goals. In addition, a thin film implementation adds insignificant weight and bulk to the optical combiner and HMD device in typical applications.

Figure 19:
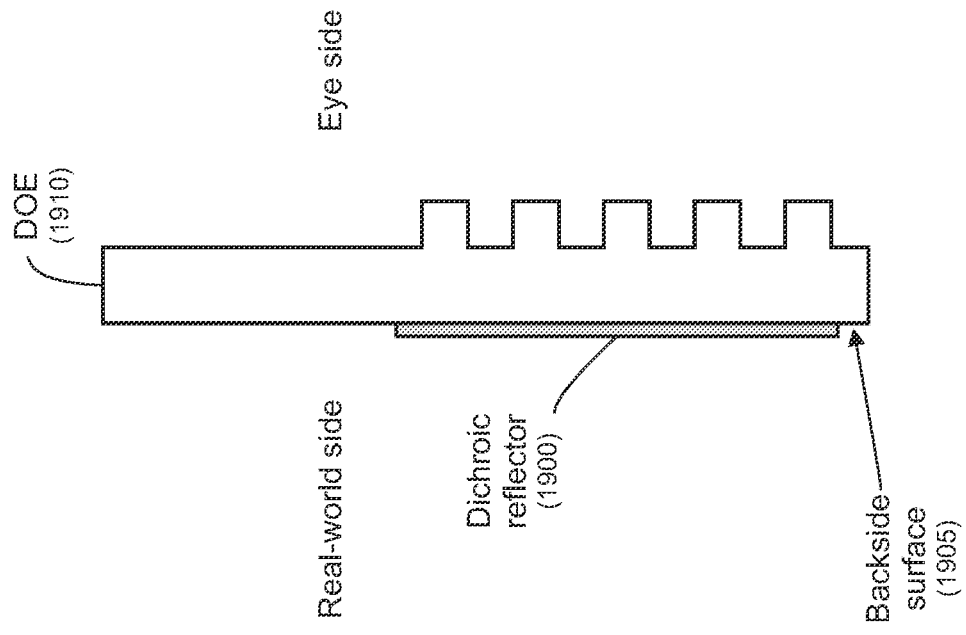
FIG. 19 shows an illustrative dichroic reflector that comprises a thin film that is disposed on a backside surface of a DOE.

FIG. 19 shows a side view of an illustrative arrangement in which a dichroic reflector 1900 is directly applied to the backside surface 1905 of a DOE 1910 which may comprise one of an in-coupling or out-coupling DOE, for example. This arrangement may be appropriately utilized in implementations in which the backside surface of the DOE is planar, for example, when the DOE is single-sided. The arrangement shown in FIG. 19 may be beneficial in some applications when the backside surfaces of the waveguides are not available to support a thin film coating, as when, for example, other optical components such as polarizing and bandpass filters are disposed on such surfaces. However, in implementations in which the DOEs are fabricated from plastic, the scope of thin film deposition processes available for use may be typically reduced because of the lower temperature tolerance of plastic relative to glass.

Figure 20:
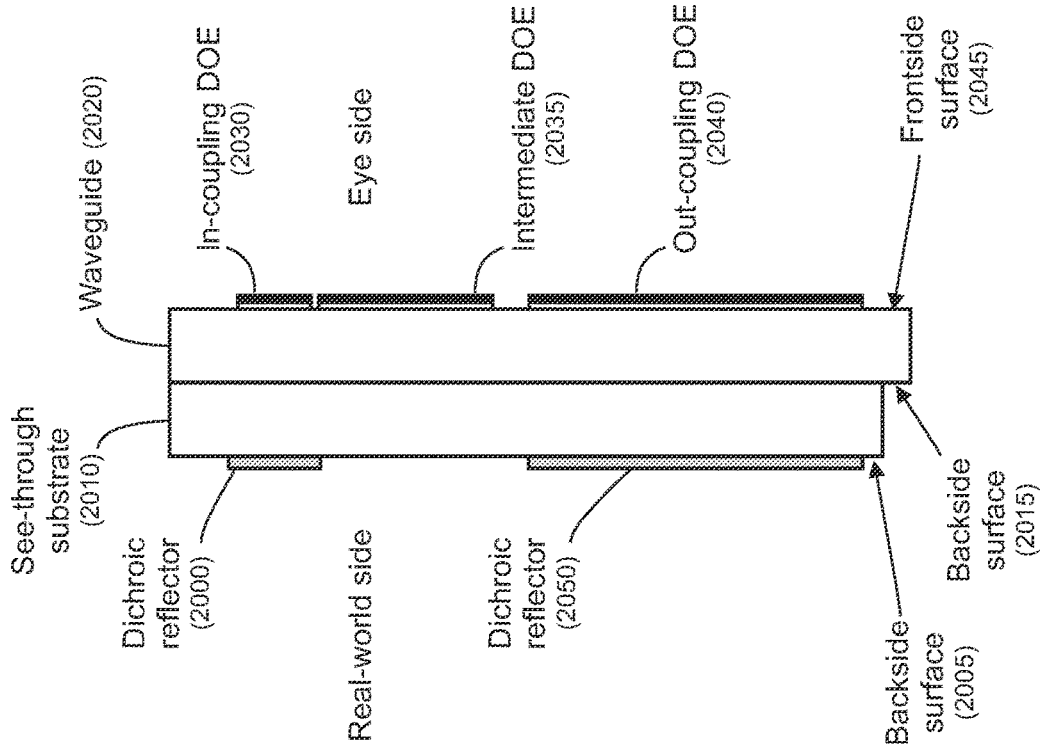
FIG. 20 shows an illustrative dichroic reflector that comprises a thin film that is disposed on a backside surface of a see-through substrate in which the substrate is affixed to a backside surface of a waveguide.

FIG. 20 shows a side view of an illustrative arrangement in which a dichroic reflector 2000 is implemented as a thin film coating that is applied to the backside surface 2005 of a see-through substrate 2010. The substrate coated with the thin film may be disposed on the backside surface 2015 of a waveguide 2020 that is used as a plate 2025 in an optical combiner. An in-coupling DOE 2030, intermediate DOE 2035, and out-coupling DOE 2040 are disposed on the frontside surface 2045 of the waveguide. As shown, the dichroic reflector 2000 is located behind the in-coupling DOE and a second dichroic reflector 2050 is located behind the out-coupling DOE. The dichroic reflector 2000 and second dichroic reflector 2050 may be respectively similar in construction, composition, and function as reflectors 1800 and 1850 shown in FIG. 18 and described in the accompanying text.

The see-through substrate 2010 may be fabricated using similar glass materials as the waveguide 2020 in some applications. The substrate can be disposed directly on the backside surface of the waveguide in some embodiments or be spaced apart from the waveguide using spacers (not shown) or other suitable fittings or structures. While an additional substrate represents an additional component that can add weight and bulk to an optical combiner and HMD device and typically requires adherence to close tolerances during assembly to maintain flatness and alignment, it may give additional design and manufacturing flexibility in some cases.

Figure 21:
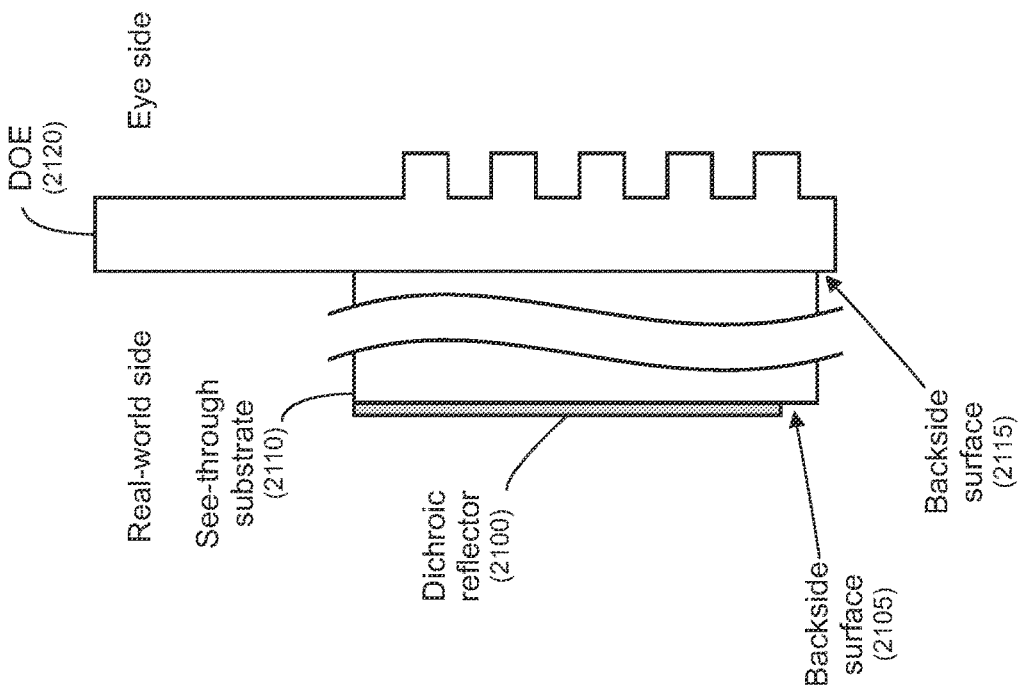
FIG. 21 shows an illustrative dichroic reflector that comprises a thin film that is disposed on a backside surface of a see-through substrate, in which the frontside surface of the substrate is affixed to a backside surface of a DOE.

FIG. 21 shows a side view of an illustrative arrangement in which a thin film coating on the backside surface 2105 of a see-through substrate 2110 implements a dichroic reflector 2100 which is disposed on the backside surface 2115 of a DOE 2120. The substrate can be disposed directly on the backside surface of the DOE in some embodiments or be spaced apart from the DOE using spacers (not shown) or other suitable fittings or structures, for example, when the DOE has a double-sided construction. As with the illustrative arrangement shown in FIG. 20, utilization of another substrate component to implement the dichroic reflector may provide additional flexibility for optical combiner design and manufacturing.

Figure 22:
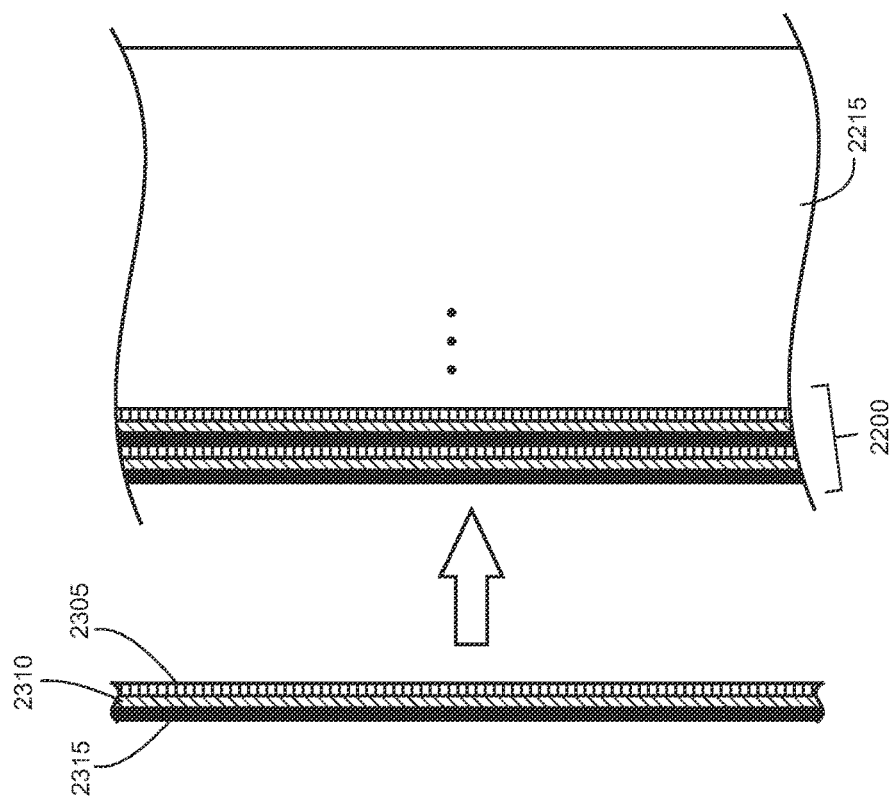
FIG. 22 shows an illustrative thin film reflective coating that includes alternating layers of two different materials on a surface of an optical material.

FIG. 22 shows an illustrative thin film coating 2200 arranged to implement a dichroic reflector that comprises alternating layers of two different materials 2205 and 2210 that are disposed on a backside surface of a waveguide 2215. In alternative embodiments, as discussed above, the thin film coating may be applied to a DOE or a see-through substrate. The materials each have a different refractive index and may include, for example, silicon dioxide ($SiO_2$), titanium dioxide ($TiO_2$), and aluminum oxide ($Al_2O_3$). In an illustrative embodiment, the layers of different materials are alternately arranged using, for example, silicon dioxide and titanium dioxide. It is noted that the number of layers shown in the drawings is intended to be illustrative and that variations from the configuration shown can be expected as necessary to meet the requirements of a particular implementation.

Other exemplary dielectric materials that can be included in the coating 2200 may include, but are not limited to, silicon hydride ($Si_xH_y$), silicon nitride ($Si_xN_y$), silicon oxynitride ($Si_xO_zN_y$), tantalum oxide ($Ta_xO_y$), gallium arsenide (GaAs), and gallium nitride (GaN). It is also possible that one or more layers of the coating may comprise metallic layers that are non-dielectric.

Chemical and/or physical deposition techniques can be used to deposit the materials on a surface of the waveguide 2215 to form the coating 2200. Exemplary chemical deposition techniques that can be used include, but are not limited to, chemical solution deposition (CSD), spin coating, chemical vapor deposition (CVD), plasma-enhanced chemical film conversion (PECFC), and atomic layer deposition (ALD). Exemplary physical deposition techniques that can be used include, but are not limited to, physical vapor deposition (PVD), molecular beam epitaxy (MBE), sputtering, pulsed laser deposition (PLD), cathodic arc deposition (arc-PVD), and electrohydrodynamic deposition.

Figure 23:
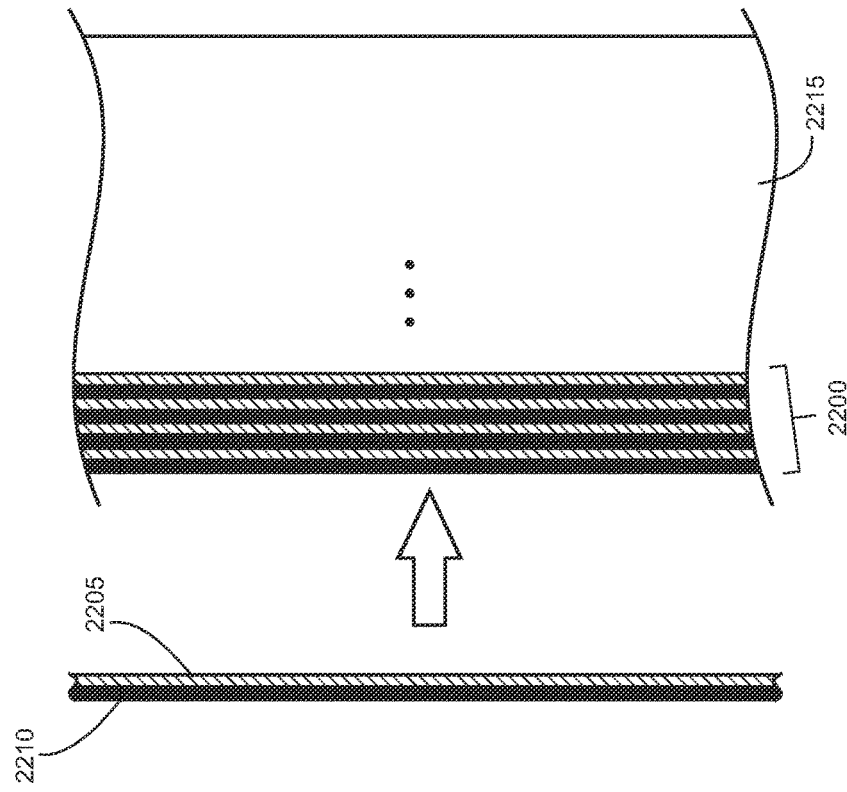
FIG. 23 shows an illustrative thin film reflective coating that includes alternating layers of two different materials on a surface of an optical material.

FIG. 23 shows an illustrative thin film reflective coating 2200 that includes alternating layers of three different materials 2305, 2310, and 2315 that are disposed on a surface of the waveguide 2215. In an illustrative embodiment, the layers of different materials are alternately arranged, for example, using silicon dioxide, titanium dioxide, and aluminum oxide.

The number of layers that are utilized for the thin film reflective coating 2200 can vary to tailor the reflectance characteristics (e.g., reflectance bandwidth, transmission bands, angular sensitivity, etc.) to meet the needs of a particular application. It may be appreciated that the composition and arrangement of the thin film coatings can be adapted to implement various reflector types including both dichroic and broadband reflectors. In general, it is desirable to minimize the number of layers to simplify fabrication and reduce cost. Thicker coatings may give rise to stresses in the dichroic reflector that can cause strain in the waveguide 2215 that may negatively impact alignment and flatness (with concomitant negative impact on MTF) and reduce reliability. While thicker substrates may be used to reduce the strain and help to maintain alignment and flatness, such configuration may result in more weight being added to the optical combiner which is typically undesirable in HMD applications.

Figure 24:
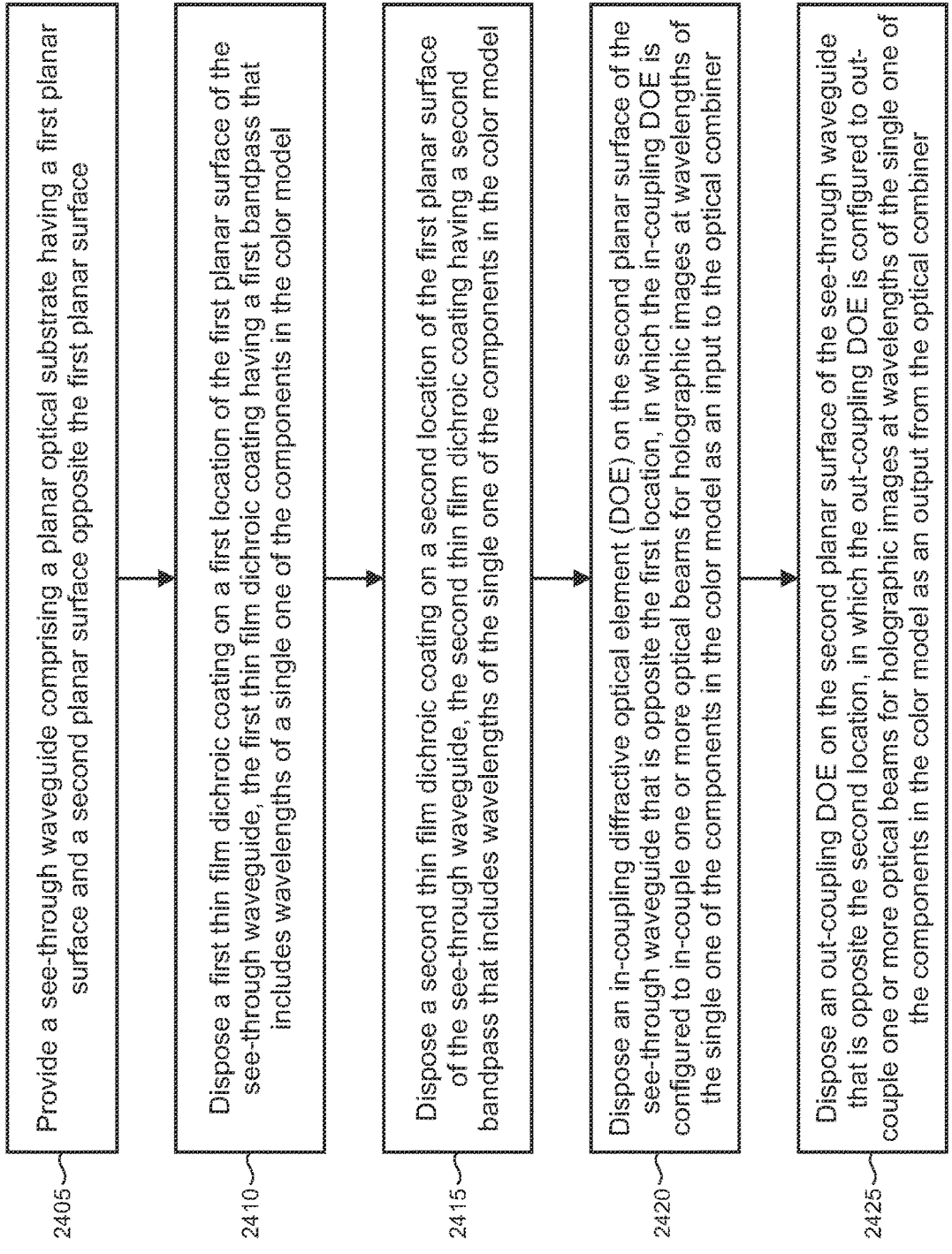
FIG. 24 is a flowchart of an illustrative method.

FIG. 24 is a flowchart 2400 of an illustrative method for assembling an optical combiner that is associated with a color model having a plurality of components and utilized in a mixed-reality environment in which holographic images are mixed with real-world images. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2405, a see-through waveguide comprising a planar optical substrate having a first planar surface and a second planar surface opposite the first planar surface is provided. In step 2410, a first thin film dichroic coating is disposed on a first location of the first planar surface of the see-through waveguide, in which the first thin film dichroic coating has a first bandpass that includes wavelengths of a single one of the components in the color model, for example, the blue component.

In step 2415, a second thin film dichroic coating is disposed on a second location of the first planar surface of the see-through waveguide, in which the second thin film dichroic coating has a second bandpass that includes wavelengths of the single one of the components in the color model, for example, the blue component.

In step 2420, an in-coupling diffractive optical element (DOE) is disposed on the second planar surface of the see-through waveguide that is opposite the first location. The in-coupling DOE is configured to in-couple one or more optical beams for holographic images at wavelengths of the single one of the components in the color model as an input to the optical combiner. For example, the in-coupling DOE may be sensitive to blue light.

In step 2425, an out-coupling DOE is disposed on the second planar surface of the see-through waveguide that is opposite the second location. The out-coupling DOE is configured to out-couple one or more optical beams for holographic images at wavelengths of the single one of the components in the color model as an output from the optical combiner. For example, the out-coupling DOE may be sensitive to blue light.

In other steps of the method (not shown in the flowchart), an intermediate DOE is disposed on the second planar surface of the waveguide at a third location. The intermediate DOE expands an exit pupil of the output relative to the input in a first direction and the out-coupling DOE expands the exit pupil in a second direction. The optical combiner can also be configured using a stack of different plates in which each plate comprises a see-through waveguide and in-coupling and out-coupling DOEs, and in which each plate in the stack corresponds to a different color component of the color model.

Figure 25:
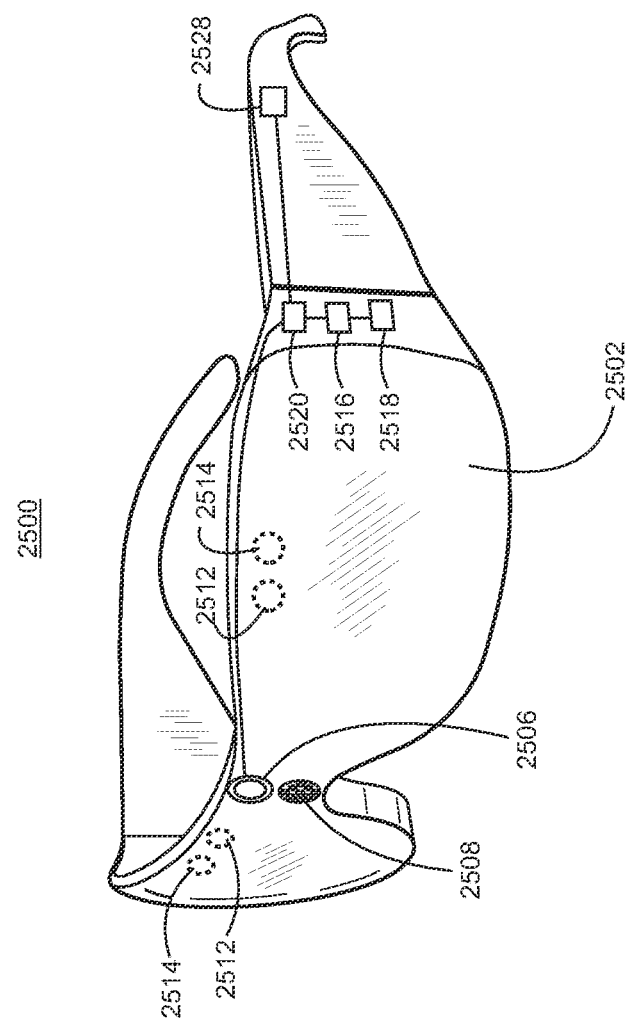
FIG. 25 is a pictorial view of an illustrative example of a virtual-reality, augmented-reality, or mixed-reality HMD device that may use the present dichroic coatings.
Figure 26:
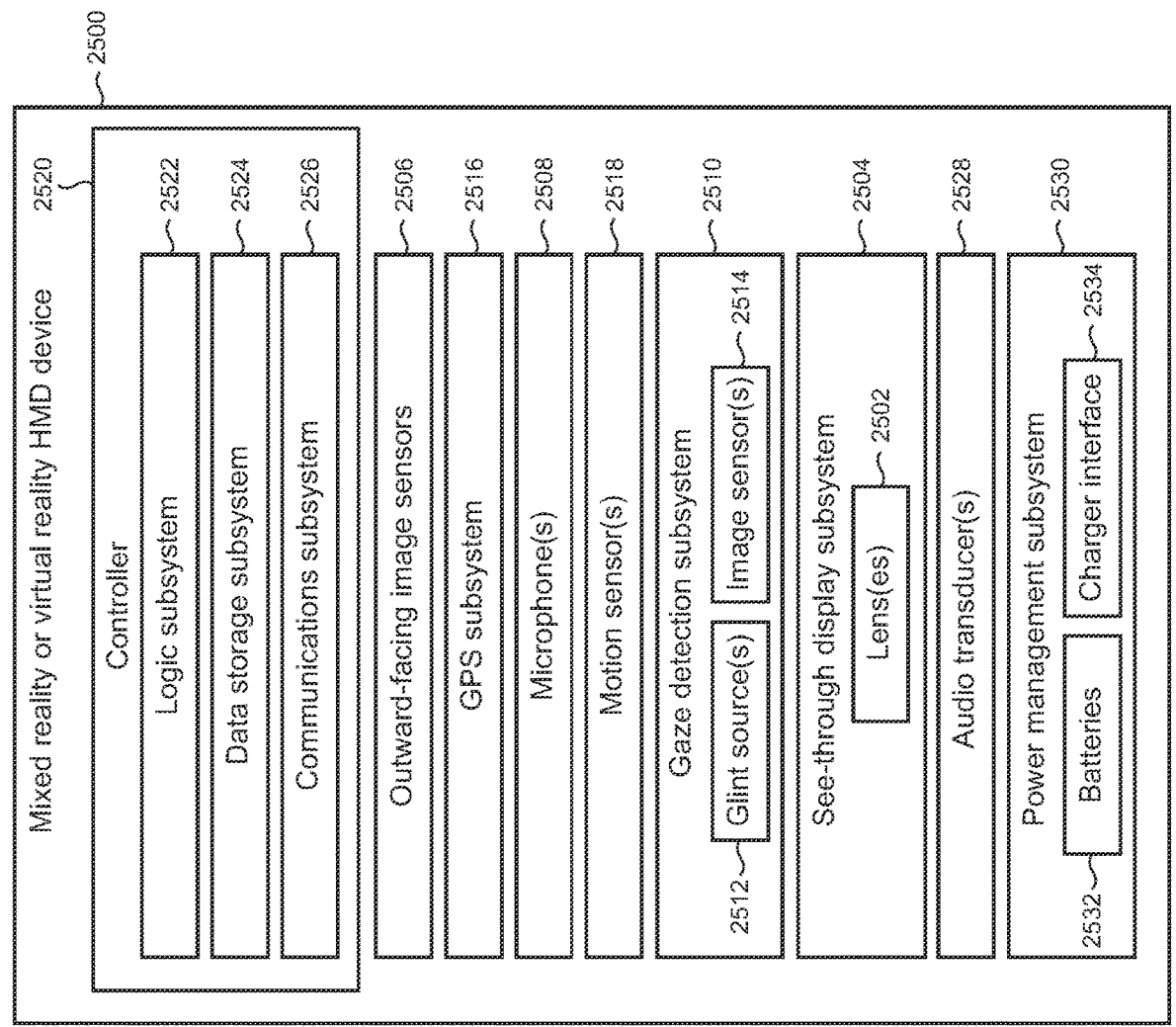
FIG. 26 shows a block diagram of an illustrative example of a virtual reality, augmented-reality, or mixed-reality HMD device that may use the present dichroic coatings.

Dichroic reflectors may be utilized in mixed-, augmented-, or virtual-reality applications. FIG. 25 shows one particular illustrative example of a mixed-reality or augmented-reality HMD device 2500, and FIG. 26 shows a functional block diagram of the device 2500. HMD device 2500 comprises one or more lenses 2502 that form a part of a see-through display subsystem 2504, so that images may be displayed using lenses 2502 (e.g. using projection onto lenses 2502, one or more waveguide systems, such as a near-eye display system, incorporated into the lenses 2502, and/or in any other suitable manner).

HMD device 2500 further comprises one or more outward-facing image sensors 2506 configured to acquire images of a background scene and/or physical environment being viewed by a user and may include one or more microphones 2508 configured to detect sounds, such as voice commands from a user. Outward-facing image sensors

2506 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The HMD device 2500 may further include a gaze detection subsystem 2510 configured for detecting a direction of gaze of each eye of a user or a direction or location of focus, as described above. Gaze detection subsystem 2510 may be configured to determine gaze directions of each of a user's eyes in any suitable manner. For example, in the illustrative example shown, a gaze detection subsystem 2510 includes one or more glint sources 2512, such as infrared light sources, that are configured to cause a glint of light to reflect from each eyeball of a user, and one or more image sensors 2514, such as inward-facing sensors, that are configured to capture an image of each eyeball of the user. Changes in the glints from the user's eyeballs and/or a location of a user's pupil, as determined from image data gathered using the image sensor(s) 2514, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2510 may have any suitable number and arrangement of light sources and image sensors. In some implementations, the gaze detection subsystem 2510 may be omitted.

The HMD device 2500 may also include additional sensors. For example, HMD device 2500 may comprise a global positioning system (GPS) subsystem 2516 to allow a location of the HMD device 2500 to be determined. This may help to identify real-world objects, such as buildings, etc. that may be located in the user's adjoining physical environment.

The HMD device 2500 may further include one or more motion sensors 2518 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 2506. The use of motion data may allow changes in gaze direction to be tracked even if image data from outward-facing image sensor(s) 2506 cannot be resolved.

In addition, motion sensors 2518, as well as microphone(s) 2508 and gaze detection subsystem 2510, also may be employed as user input devices, such that a user may interact with the HMD device 2500 via gestures of the eye, neck and/or head, as well as via verbal commands in some cases. It may be understood that sensors illustrated in FIGS. 25 and 26 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2500 can further include a controller 2520 such as one or more processors having a logic subsystem 2522 and a data storage subsystem 2524 in communication with the sensors, gaze detection subsystem 2510, display subsystem 2504, and/or other components through a communications subsystem 2526. The communications subsystem 2526 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2524 may include instructions stored thereon that are executable by logic subsystem 2522, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2500 is configured with one or more audio transducers 2528 (e.g., speakers, earphones, etc.) so that audio can be utilized as part of a mixed reality or virtual reality experience. A power management subsystem 2530 may include one or more batteries 2532 and/or protection circuit modules (PCMs) and an associated charger interface 2534 and/or remote power interface for supplying power to components in the HMD device 2500.

It may be appreciated that the HMD device 2500 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 27:
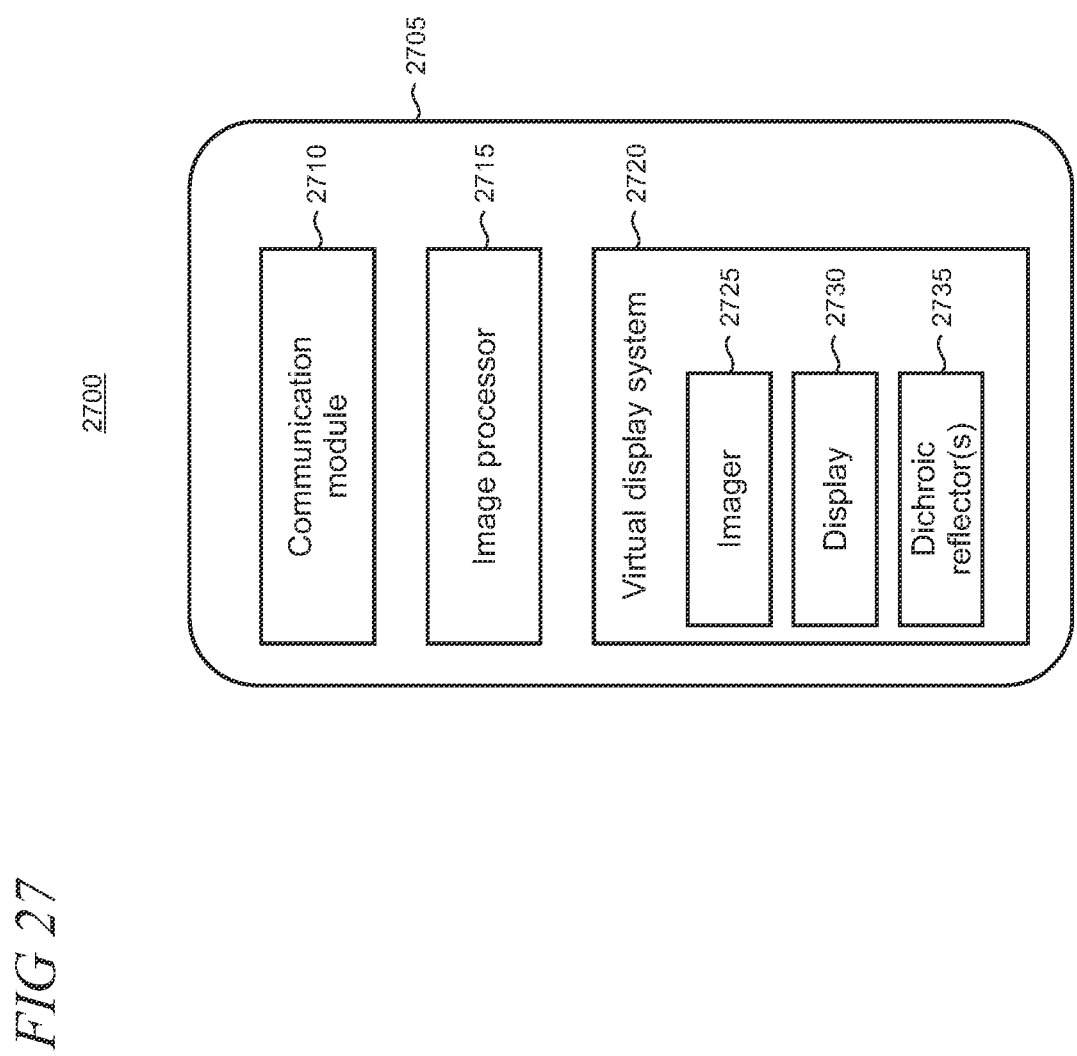
FIG. 27 shows a block diagram of an illustrative electronic device that incorporates a mixed-reality display system that may use the present dichroic coatings.

As shown in FIG. 27, a dichroic reflector can be used in a mobile or portable electronic device 2700, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 2700 includes a housing 2705 to house a communication module 2710 for receiving and transmitting information from and to an external device, or a remote system or service (not shown).

The portable device 2700 may also include an image processor 2715 using one or more processors for handling the received and transmitted information, and a virtual display system 2720 to support viewing of images. The virtual display system 2720 can include a micro-display or an imager 2725 configured to provide holographic images on a display 2730. The image processor 2715 may be operatively connected to the imager 2725 and obtain real-world image data, such as video data from a camera in the device (not shown), so that virtual- and/or mixed-reality images may be rendered on the display 2730. In implementations in which one or more DOEs are utilized to support the display, or where real- or virtual-world image light propagates in a direction opposite to the user's eyes, one or more dichroic reflectors 2735 may implemented in accordance with the inventive principles of operation discussed herein.

Dichroic coatings may also be utilized in non-portable devices that are configured for virtual- and/or mixed-reality applications having a display, such as gaming devices, multimedia consoles, personal computers, vending machines, smart appliances, Internet-connected devices, and home appliances, such as an oven, microwave oven and other appliances, and other non-portable devices.

Various exemplary embodiments of the present dichroic coatings to improve display uniformity and light security in an optical combiner are now presented by way of illustration and not as an exhaustive list of all embodiments. An example includes a near-eye optical system arranged to output a display of virtual-reality images conforming to a color model that are superimposed over real-world images, comprising: a see-through planar optical waveguide through which real-world images are viewable by a user of the near-eye optical system, the optical waveguide including a first planar side and a second planar side opposite the first planar side; an in-coupling diffractive optical element (DOE) disposed on a surface of one of the planar sides of the optical waveguide, the in-coupling DOE having an input region and configured to in-couple, as an input, one or more optical beams associated with holographic images from a holographic image source, in which the one or more optical beams comprise a plurality of ranges of wavelengths, in which each range of wavelengths respectively corresponds to a color component in the color model; an out-coupling DOE disposed on a surface of one of the planar sides of the optical waveguide, the out-coupling DOE having an output region and configured for pupil expansion of the one or more optical beams along at least one direction, and further configured to out-couple, as an output display from the output region to an eye of the user, the one or more optical beams having expanded pupil relative to the input; and a thin film reflective coating disposed on a surface of a planar side of the optical waveguide that is opposite the in-coupling DOE, the thin film reflective coating having a bandpass that includes wavelengths of one of the ranges of wavelengths.

In another example, the thin film reflective coating comprises multiple layers of two or more dielectric materials, each of the two or more dielectric materials having a different refractive index. In another example, the dielectric materials comprise one of silicon dioxide ($SiO_2$), titanium dioxide ($TiO_2$), or aluminum oxide ($Al_2O_3$) and in which the thin film reflective coating comprises one of a dichroic reflector or a broadband reflector. In another example, the color model comprises an RGB (red, green, blue) color model that includes a red component, a green component, and a blue component. In another example, the near-eye optical system further comprises a second see-through planar optical waveguide and a third see-through planar optical waveguide, each of the see-through planar optical waveguides having corresponding in-coupling and out-coupling DOEs and being configured in a stack to form an optical combiner wherein each see-through planar optical waveguide in the optical combiner propagates one or more optical beams for the holographic images for a different component of the RGB color model. In another example, the near-eye optical system further includes a thin film reflective coating disposed on a surface of a planar side of the optical waveguide that is opposite the out-coupling DOE, in which a bandpass of the dichroic coating opposite the out-coupling DOE equals the bandpass for the dichroic coating opposite the in-coupling DOE. In another example, the near-eye optical system further includes an intermediate DOE that is disposed on a surface of one of the planar sides of the optical waveguide and configured to receive the one or more optical beams from the in-coupling DOE and propagate the received one or more optical beams to the out-coupling DOE, in which the intermediate DOE is configured for pupil expansion of the one or more optical beams in a direction that is different from the at least one direction of pupil expansion that is performed in the out-coupling DOE.

A further example includes a head-mounted display (HMD) device wearable by a user and including a near-eye display device providing full color holographic images from a virtual world that are represented with a color model and real-world images for objects in a real world, comprising: an imager generating one or more optical beams for the holographic images for each individual color component of the color model; an optical combiner comprising a plurality of plates in which a plate respectively corresponds to each individual color component, the plates being optically aligned in a planar stack configured to receive and combine the individual color components of one or more optical beams received as an input from the imager into the full color holographic images as an output from the optical combiner, and each plate comprising a waveguide; an exit pupil expander disposed on each plate's waveguide, each exit pupil expander comprising multiple diffractive optical elements (DOEs), wherein each exit pupil expander is configured to provide one or more out-coupled optical beams as an output of a respective plate having an expanded exit pupil, and wherein each of the waveguides includes a first planar surface and a second planar surface opposite the first planar surface, the first planar surface facing the user's eyes and the second planar surface facing the real world when the HMD device is worn; and a dichroic reflector located on the second planar surface of a waveguide of at least one plate, the dichroic reflector being configured to block optical beams for the corresponding color component for the at least one plate from being cross-coupled to one or more of the other plates in the optical combiner.

In another example, the dichroic reflector comprises a thin film reflective coating that is disposed on the second planar surface of the waveguide of the at least one plate as alternating layers of dielectric materials each having a different index of refraction. In another example, the exit pupil expander provides exit pupil expansion in two directions. In another example, the imager includes one or more of light emitting diode, liquid crystal on silicon device, organic light emitting diode array, or micro-electro mechanical system device. In another example, each of the waveguides and DOEs is configured to be see-through. In another example, the optical combiner includes three plates wherein a separate plate is utilized for each color component of a red, green, blue (RGB) color model. In another example, a bandpass for the dichroic reflector is tuned to the corresponding color component for the at least one plate. In another example, the HMD device further includes a second dichroic reflector that is located on the second planar surface of the waveguide of the at least one plate, the second dichroic reflector being configured to reflect holographic image light that is forward-projected towards the real world from the one at least one plate back towards the user's eyes.

A further example includes a method for assembling an optical combiner that is associated with a color model having a plurality of components and utilized in a mixed-reality environment in which holographic images are mixed with real-world images, comprising: providing a see-through waveguide comprising a planar optical substrate having a first planar surface and a second planar surface opposite the first planar surface; disposing a first thin film dichroic coating on a first location of the first planar surface of the see-through waveguide, the first thin film dichroic coating having a first bandpass that includes wavelengths of a single one of the components in the color model; disposing a second thin film dichroic coating on a second location of the first planar surface of the see-through waveguide, the second thin film dichroic coating having a second bandpass that includes wavelengths of the single one of the components in the color model; disposing an in-coupling diffractive optical element (DOE) on the second planar surface of the see-through waveguide that is opposite the first location, in which the in-coupling DOE is configured to in-couple one or more optical beams for holographic images at wavelengths of the single one of the components in the color model as an input to the optical combiner; and disposing an out-coupling DOE on the second planar surface of the see-through waveguide that is opposite the second location, in which the out-coupling DOE is configured to out-couple one or more optical beams for holographic images at wavelengths of the single one of the components in the color model as an output from the optical combiner.

In another example, the method further includes disposing an intermediate DOE on the second planar surface of the waveguide at a third location, wherein the intermediate DOE expands an exit pupil of the output relative to the input in a first direction and the out-coupling DOE expands the exit pupil in a second direction. In another example, the first bandpass and second bandpass are equal. In another example, the method further includes configuring the optical combiner using a stack of different plates, each plate comprising a see-through waveguide and in-coupling and out-coupling DOEs, wherein each plate in the stack corresponds to a different color component of the color model. In another example, the optical combiner is used in a mixed-reality see-through display device and the second thin film dichroic coating is configured to be at least partially see-through.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A near-eye optical system arranged to output a display of virtual-reality holographic images conforming to a color model that are superimposed over views of a real world, comprising:
    a see-through planar optical waveguide through which the real world is viewable by a user of the near-eye optical system, the optical waveguide including a first planar side and a second planar side opposite the first planar side;
    an in-coupling diffractive optical element (DOE) disposed on a surface of one of the planar sides of the optical waveguide, the in-coupling DOE having an input region and configured to in-couple, as an input, one or more optical beams associated with holographic images from a holographic image source, in which the one or more optical beams comprise a plurality of ranges of wavelengths, in which each range of wavelengths respectively corresponds to a color component in the color model;
    an out-coupling DOE disposed on a surface of one of the planar sides of the optical waveguide, the out-coupling DOE having an output region and configured for pupil expansion of the one or more optical beams along at least one direction, and further configured to out-couple, as an output display from the output region to an eye of the user, the one or more optical beams having expanded pupil relative to the input;
    a first dichroic reflector disposed on a surface of a planar side of the optical waveguide that is opposite the in-coupling DOE, the first dichroic reflector having a bandpass that includes wavelengths of one of the ranges of wavelengths; and
    a second dichroic reflector located on the second planar side of the waveguide opposite the out-coupling DOE, the second dichroic reflector being co-planar with the first dichroic reflector and having a bandpass matching that of the first dichroic reflector, and the second dichroic reflector configured to reflect holographic image light that is forward-projected towards the real world from the out-coupling DOE back towards the user's eyes.

2. The near-eye optical system of claim 1 in which at least one of the first or second dichroic reflectors comprises a thin film reflective coating including multiple layers of two or more dielectric materials, each of the two or more dielectric materials having a different refractive index.

3. The near-eye optical system of claim 2 in which the dielectric materials comprise one of silicon dioxide ($SiO_2$), titanium dioxide ($TiO_2$), or aluminum oxide ($Al_2O_3$) and in which the thin film reflective coating comprises one of a dichroic reflector or a broadband reflector.

4. The near-eye optical system of claim 1 in which the color model comprises an RGB (red, green, blue) color model that includes a red component, a green component, and a blue component.

5. The near-eye optical system of claim 4 further comprising a second see-through planar optical waveguide and a third see-through planar optical waveguide, each of the see-through planar optical waveguides having corresponding in-coupling and out-coupling DOEs and being configured in a stack to form an optical combiner wherein each see-through planar optical waveguide in the optical combiner propagates one or more optical beams for the holographic images for a different component of the RGB color model.

6. The near-eye optical system of claim 1 further including an intermediate DOE that is disposed on a surface of one of the planar sides of the optical waveguide and configured to receive the one or more optical beams from the in-coupling DOE and propagate the received one or more optical beams to the out-coupling DOE, in which the intermediate DOE is configured for pupil expansion of the one or more optical beams in a direction that is different from the at least one direction of pupil expansion that is performed in the out-coupling DOE.

7. A head-mounted display (HMD) device wearable by a user and including a near-eye display device providing full color holographic images from a virtual world that are represented with a color model and views of objects in a real world, comprising:
    an imager generating one or more optical beams for the holographic images for each individual color component of the color model;
    an optical combiner comprising a plurality of plates in which a plate respectively corresponds to each individual color component, the plates being optically aligned in a planar stack configured to receive and combine the individual color components of one or more optical beams received as an input from the imager into the full color holographic images as an output from the optical combiner, and each plate comprising a waveguide;

an exit pupil expander disposed on each plate's waveguide, each exit pupil expander comprising multiple diffractive optical elements (DOEs), wherein each exit pupil expander is configured to provide one or more out-coupled optical beams as an output of a respective plate having an expanded exit pupil, and wherein each of the waveguides includes a first planar surface and a second planar surface opposite the first planar surface, the first planar surface facing the user's eyes and the second planar surface facing the real world when the HMD device is worn;

a first dichroic reflector located on the second planar surface of a waveguide of at least one plate, the first dichroic reflector configured to block optical beams for the corresponding color component for the at least one plate from being cross-coupled to one or more of the other plates in the optical combiner; and a second dichroic reflector located on the second planar surface of the waveguide of the at least one plate, the second dichroic reflector being co-planar with the first dichroic filter, and the second dichroic filter configured to reflect holographic image light that is forward-projected towards the real world from the exit pupil expander back towards the user's eyes.

8. The HMD device of claim 7 in which the dichroic reflector comprises a thin film reflective coating that is disposed on the second planar surface of the waveguide of the at least one plate as alternating layers of dielectric materials each having a different index of refraction.

9. The HMD device of claim 7 in which the exit pupil expander provides exit pupil expansion in two directions.

10. The HMD device of claim 7 in which the imager includes one or more of light emitting diode, liquid crystal on silicon device, organic light emitting diode array, or micro-electro mechanical system device.

11. The HMD device of claim 7 in which each of the waveguides and DOEs is configured to be see-through.

12. The HMD device of claim 7 in which the optical combiner includes three plates wherein a separate plate is utilized for each color component of a red, green, blue (RGB) color model.

13. The HMD device of claim 7 in which a bandpass for the dichroic reflector is tuned to the corresponding color component for the at least one plate.

14. A method for assembling an optical combiner that is associated with a color model having a plurality of components and utilized by a user in a mixed-reality environment in which holographic images are mixed with views of a real world, comprising:

providing a see-through waveguide comprising a planar optical substrate having a first planar surface and a second planar surface opposite the first planar surface;

disposing a first thin film dichroic coating on a first location of the first planar surface of the see-through waveguide, the first thin film dichroic coating having a first bandpass that includes wavelengths of a single one of the components in the color model;

disposing a second thin film dichroic coating on a second location of the first planar surface of the see-through waveguide, the second thin film dichroic coating having a second bandpass that includes wavelengths of the single one of the components in the color model;

disposing an in-coupling diffractive optical element (DOE) on the second planar surface of the see-through waveguide that is opposite the first location, in which the in-coupling DOE is configured to in-couple holographic image light at wavelengths of the single one of the components in the color model as an input to the optical combiner; and disposing an out-coupling DOE on the second planar surface of the see-through waveguide that is opposite the second location on which the second thin film dichroic coating is disposed, in which the out-coupling DOE is configured to out-couple one or more optical beams for holographic image light at wavelengths of the single one of the components in the color model as an output from the optical combiner, and in which the second thin film dichroic coating is configured to reflect holographic image light that is forward-projected towards the real world from out-coupling DOE back towards the user's eyes.

15. The method of claim 14 further including disposing an intermediate DOE on the second planar surface of the waveguide at a third location, wherein the intermediate DOE expands an exit pupil of the output relative to the input in a first direction and the out-coupling DOE expands the exit pupil in a second direction.

16. The method of claim 14 in which the first bandpass and second bandpass are equal.

17. The method of claim 14 further including configuring the optical combiner using a stack of different plates, each plate comprising a see-through waveguide and in-coupling and out-coupling DOEs, wherein each plate in the stack corresponds to a different color component of the color model.

18. The method of claim 14 in which the optical combiner is used in a mixed-reality see-through display device and the second thin film dichroic coating is configured to be at least partially see-through.

* * * * *